US012223611B2

United States Patent
Shayani et al.

(10) Patent No.: US 12,223,611 B2
(45) Date of Patent: Feb. 11, 2025

(54) GENERATING STYLES FOR NEURAL STYLE TRANSFER IN THREE-DIMENSIONAL SHAPES

(71) Applicant: AUTODESK, INC., San Francisco, CA (US)

(72) Inventors: Hooman Shayani, Longfield (GB); Marco Fumero, Rome (IT); Aditya Sanghi, Toronto (CA)

(73) Assignee: AUTODESK, INC., San Francisco, CA (US)

( * ) Notice: Subject to any disclaimer, the term of this patent is extended or adjusted under 35 U.S.C. 154(b) by 210 days.

(21) Appl. No.: 18/149,609

(22) Filed: Jan. 3, 2023

(65) Prior Publication Data

US 2023/0326159 A1   Oct. 12, 2023

Related U.S. Application Data

(60) Provisional application No. 63/328,658, filed on Apr. 7, 2022.

(51) Int. Cl.
*G06T 19/20* (2011.01)
*G06N 3/0455* (2023.01)
*G06N 3/0475* (2023.01)
*G06N 3/08* (2023.01)
*G06N 3/092* (2023.01)
(Continued)

(52) U.S. Cl.
CPC ........... *G06T 19/20* (2013.01); *G06N 3/0455* (2023.01); *G06N 3/0475* (2023.01); *G06N 3/08* (2013.01); *G06N 3/092* (2023.01); *G06T 17/00* (2013.01); *G06T 17/10* (2013.01);
(Continued)

(58) Field of Classification Search
None
See application file for complete search history.

(56) References Cited

U.S. PATENT DOCUMENTS

2004/0135788 A1   7/2004   Davidson et al.
2018/0373999 A1   12/2018  Xu
(Continued)

OTHER PUBLICATIONS

Berkiten et al., "Learning Detail Transfer based on Geometric Features", DOI:10.1111/cgf.13132, vol. 36, No. 2, 2017, pp. 361-373.

(Continued)

*Primary Examiner* — Yanna Wu
(74) *Attorney, Agent, or Firm* — Artegis Law Group, LLP

(57) ABSTRACT

One embodiment of the present invention sets forth a technique for performing style transfer. The technique includes determining a distribution associated with a plurality of style codes for a plurality of three-dimensional (3D) shapes, where each style code included in the plurality of style codes represents a difference between a first 3D shape and a second 3D shape, and where the second 3D shape is generated by applying one or more augmentations to the first 3D shape. The technique also includes sampling from the distribution to generate an additional style code and executing a trained machine learning model based on the additional style code to generate an output 3D shape having style-based attributes associated with the additional style code and content-based attributes associated with an object. The technique further includes generating a 3D model of the object based on the output 3D shape.

20 Claims, 8 Drawing Sheets

(51) Int. Cl.
  *G06T 17/00* (2006.01)
  *G06T 17/10* (2006.01)
(52) U.S. Cl.
  CPC .. *G06T 2210/56* (2013.01); *G06T 2219/2021* (2013.01); *G06T 2219/2024* (2013.01)

(56) References Cited

U.S. PATENT DOCUMENTS

| | | | |
|---|---|---|---|
| 2019/0244329 | A1 | 8/2019 | Li et al. |
| 2020/0151559 | A1* | 5/2020 | Karras ............... G06N 3/047 |
| 2021/0183033 | A1 | 6/2021 | Chung et al. |
| 2021/0264236 | A1 | 8/2021 | Xu et al. |
| 2021/0279938 | A1 | 9/2021 | Chandran et al. |
| 2022/0156415 | A1 | 5/2022 | Meltzer et al. |
| 2022/0156416 | A1 | 5/2022 | Meltzer et al. |
| 2022/0156420 | A1 | 5/2022 | Meltzer et al. |
| 2022/0156987 | A1* | 5/2022 | Chandran ............ G06N 3/047 |
| 2023/0109732 | A1 | 4/2023 | Hertzmann et al. |

OTHER PUBLICATIONS

Cao et al., "PSNet: A Style Transfer Network for Point Cloud Stylization on Geometry and Color", IEEE, https://doi.org/10.1109/WACV45572.2020.9093513, 2020, pp. 3326-3334.

Chang et al., "ShapeNet: An Information-Rich 3D Model Repository", https://arxiv.org/abs/1512.03012, Dec. 9, 2015, 11 pages.

Chen et al., "DECOR-GAN: 3D Shape Detailization by Conditional Refinement", arXiv:2012.09159, Mar. 29, 2021, 25 pages.

Chen et al., "Learning Implicit Fields for Generative Shape Modeling", arXiv:1812.02822, Sep. 16, 2019, 10 pages.

Chen et al., "Multiresolution Deep Implicit Functions for 3D Shape Representation", https://arxiv.org/abs/2109.05591, Sep. 2021, 20 pages.

Chibane et al., "Implicit Functions in Feature Space for 3D Shape Reconstruction and Completion", In Proceedings of the IEEE/CVF Conference on Computer Vision and Pattern Recognition, 2020, pp. 6970-6981.

Gatys et al., "Image Style Transfer Using Convolutional Neural Networks", In Proceedings of the IEEE conference on Computer Vision and Pattern Recognition, 2016, pp. 2414-2423.

Gropp et al., "Implicit Geometric Regularization for Learning Shapes", ICML, arXiv:2002.10099, Jul. 9, 2020, 14 pages.

Huang et al., "Arbitrary Style Transfer in Real-time with Adaptive Instance Normalization", arXiv:1703.06868, Jul. 30, 2017, 11 pages.

Jing et al., "Neural Style Transfer: A Review", https://arxiv.org/abs/1705.04058, May 11, 2017, 14 pages.

Koch et al., "ABC: A Big CAD Model Dataset for Geometric Deep Learning", https://arxiv.org/abs/1812.06216, Dec. 15, 2018, 15 pages.

Kolkin et al., "Style Transfer by Relaxed Optimal Transport and Self-Similarity", In Proceedings of the IEEE/CVF Conference on Computer Vision and Pattern Recognition, 2019, pp. 10051-10060.

Li et al., "Demystifying Neural Style Transfer", arXiv:1701.01036, Jul. 1, 2017, 7 pages.

Liu et al., "Cubic Stylization", https://doi.org/10.1145/3355089.3356495, ACM Transactions on Graphics, vol. 38, No. 6, Article 197, Nov. 2019, pp. 197:1-197:10.

Liu et al., "Normal-Driven Spherical Shape Analogies", https://arxiv.org/abs/2104.11993, vol. 40, No. 5, Jul. 11, 2021, 11 pages.

Liu et al., "Neural Subdivision", ACM Transactions on Graphics, vol. 39, No. 4, Article 1, https://doi.org/10.1145/3386569.3392418, Jul. 2020, pp. 1:1-1:16.

Liu et al., "A Survey of Manufacturing Oriented Topology Optimization Methods", https://doi.org/10.1016/j.advengsoft.2016.07.017, Advances in Engineering Software, vol. 100, 2016, pp. 161-175.

Lun et al., "Elements of Style: Learning Perceptual Shape Style Similarity", https://doi.org/10.1145/2766929, ACM Transactions on Graphics, vol. 34, No. 4, Article 84, Aug. 2015, pp. 84:1-84:14.

Lun et al., "Functionality Preserving Shape Style Transfer", https://doi.org/10.1145/2980179.2980237, ACM Transactions on Graphics, vol. 35, No. 6, Article 209, Nov. 2016, pp. 209:1-209:14.

Ma et al., "Analogy-Driven 3D Style Transfer", In Computer Graphics Forum, vol. 33, No. 2, 2014, pp. 175-184.

Marin et al., "Instant Recovery of Shape from Spectrum via Latent Space Connections", arXiv:2003.06523, Nov. 4, 2020, 17 pages.

Meltzer et al., "UVStyle-Net: Unsupervised Few-shot Learning of 3D Style Similarity Measure for B-Reps", arXiv:2105.02961, Oct. 11, 2021, 13 pages.

Mescheder et al., "Occupancy Networks: Learning 3D Reconstruction in Function Space", arXiv:1812.03828, Apr. 30, 2019, 11 pages.

Mroueh, Youssef, "Wasserstein Style Transfer", In International Conference on Artificial Intelligence and Statistics, PMLR, vol. 108, 2020, 10 pages.

Park et al., "DeepSDF: Learning Continuous Signed Distance Functions for Shape Representation", arXiv:1901.05103, Jan. 16, 2019, 19 pages.

Qi et al., "PointNet: Deep Learning on Point Sets for 3D Classification and Segmentation", https://arxiv.org/abs/1612.00593, Dec. 2, 2016, 19 pages.

Segu et al., "3DSNet: Unsupervised Shape-to-Shape 3D Style Transfer", arXiv:2011.13388, Nov. 26, 2020, 14 pages.

Sorkine, Olga, "Laplacian Mesh Processing", https://doi.org/10.2312/egst.20051044, Eurographics, 2005, 18 pages.

Wang et al., "Intrinsic and Extrinsic Operators for Shape Analysis", Handbook of Numerical Analysis, Chapter 2, vol. 20, 2019, pp. 41-115.

Barroqueiro et al., "Bridging between topology optimization and additive manufacturing via Laplacian smoothing", Journal of Mechanical Design, vol. 143, No. 9, 2021, 9 pages.

Notice of Allowance received for U.S. Appl. No. 18/149,605 dated Aug. 7, 2024, 17 pages.

Notice of Allowance received for U.S. Appl. No. 18/149,601 dated Aug. 19, 2024, 17 pages.

Friedrich et al., "Standardization of Gram Matrix for Improved 3D Neural Style Transfer", IEEE Symposium Series on Computational Intelligence, Dec. 6-9, 2019, pp. 1375-1382.

Regateiro et al., "3D Human Shape Style Transfer", Computer Vision and Pattern Recognition, arXiv:2109.01587, Sep. 6, 2021, pp. 1-12.

Xie et al., "Design of Painting Art Style Rendering System Based on Convolutional Neural Network", Scientific Programming, https://doi.org/10.1155/2021/4708758, 2021, pp. 1-21.

* cited by examiner

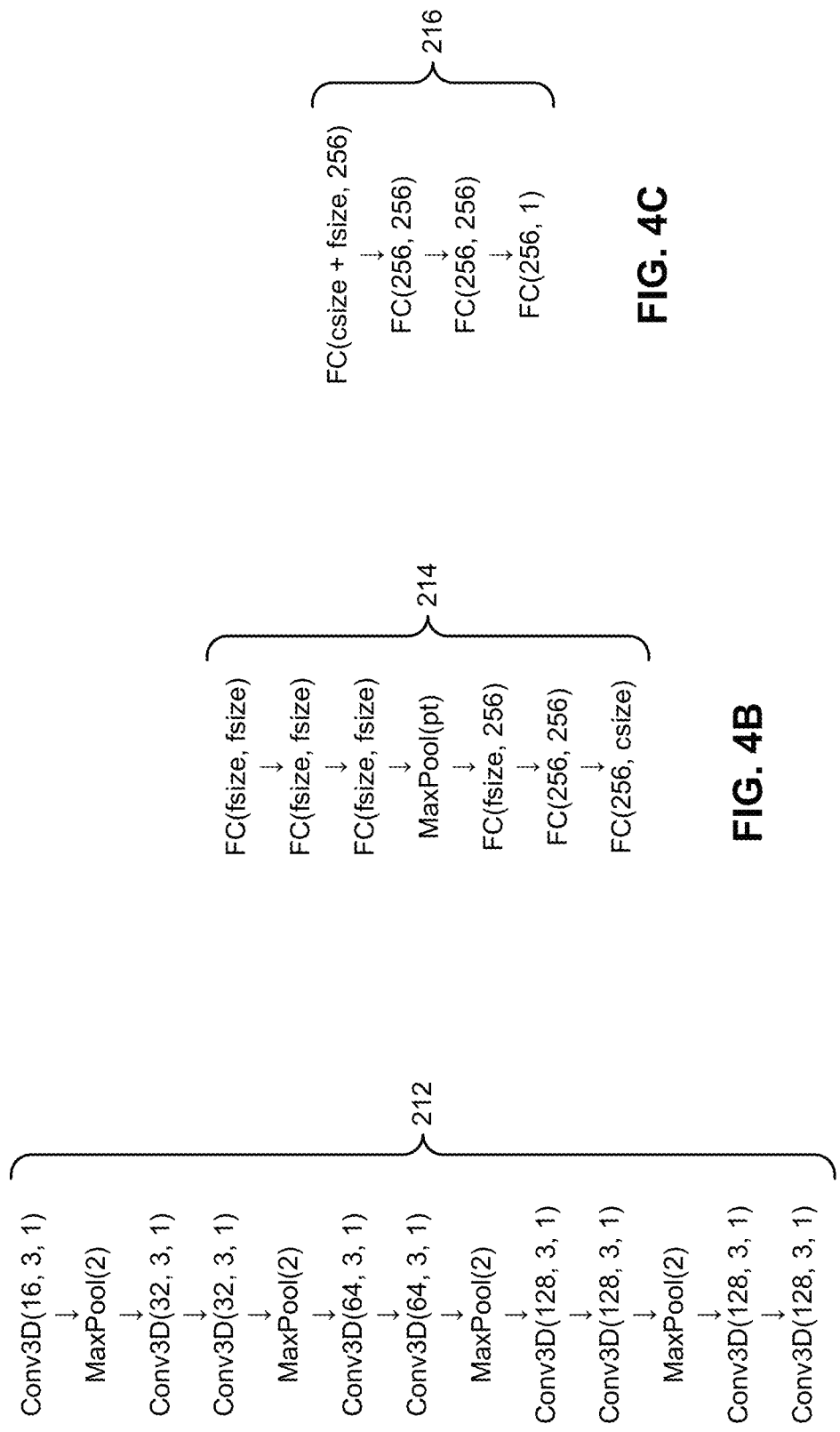

GENERATING STYLES FOR NEURAL STYLE TRANSFER IN THREE-DIMENSIONAL SHAPES

CROSS-REFERENCE TO RELATED APPLICATIONS

This application claims the benefit of the U.S. Provisional Application titled "TECHNIQUES FOR SYNTHESIZING SHAPES IN PREFERRED STYLES," filed on Apr. 7, 2022, and having Ser. No. 63/328,658. The subject matter of this application is hereby incorporated herein by reference in its entirety.

BACKGROUND

Field of the Various Embodiments

Embodiments of the present disclosure relate generally to computer science and machine learning and, more specifically, to generating styles for neural style transfer in three-dimensional shapes.

DESCRIPTION OF THE RELATED ART

Style transfer refers to the manipulation of an image, a video, an audio, or another piece of media to adopt the appearance or visual style belonging to a different piece of media. For example, colors, patterns, textures, and/or other attributes that are indicative of a style of a first image or painting could be transferred onto one or more faces, buildings, vehicles, animals, and/or other objects depicted in a second image or painting without altering the identity of the objects in the second image.

Style transfer can also be applied to three-dimensional (3D) shapes. For example, style transfer techniques could be used to convert a first 3D shape that captures the structure of a generic car (e.g., wheels, body, doors, windows, etc.) into a second 3D shape that reflects the specific design or "look" of a particular brand or model of car. The second 3D shape could then be used in various applications, such as a computer simulation, a video game, an augmented reality environment or application, a virtual reality environment or application, and/or a computer-generated design.

Traditional approaches for synthesizing 3D shapes in certain styles involve artists or designers expending significant time and effort in developing and refining 3D models representing the 3D shapes. When stylistic features are to be transferred from a first 3D model to a second 3D model, these artists or designers similarly perform manual refinement of the second 3D model until the style of the first 3D model is reflected in the second 3D model.

To reduce the time and effort associated with generating a 3D shape in a certain style, computer-graphics-based style transfer techniques have been developed. These techniques typically use geometric correspondences and/or transformations to transfer style-based attributes from certain regions of a first 3D shape to the corresponding regions of a second 3D shape. However, these techniques use a limited set of geometric correspondences and/or transformations to perform the actual style transfer, resulting in 3D shapes that oftentimes do not fully depict all levels of detail found in the transferred styles. For example, the use of geometric correspondences and/or transformations to transfer a style from a first 3D shape to a second 3D shape could cause the second 3D shape to lack high-frequency or fine-grained details that are found in the style of the first 3D shape.

More recently, machine learning models have been developed to perform style transfer between 3D shapes. While these machine learning models do not require explicit geometric correspondences and are able to transfer varying levels of detail between the 3D shapes, the machine learning models are typically trained using an ambiguous definition of style that interferes with the ability of the machine learning models to transfer specific types of visual detail between different shapes. For example, a neural network could be trained to upsample a coarse shape representing a car into a detailed shape representing a certain brand or model of car. However, the neural network could fail to include certain details (e.g., curves, dimensions, proportions, angles, visual details, etc.) that are typically found in that brand or model of car in the detailed shape because the neural network was not trained to be specifically aware of these details.

Further, many machine-learning-based approaches for style transfer require style-labelled training data, which limits the ability of these approaches to generalize to various 3D shapes and/or attributes pertaining to style or content. Additionally, these machine-learning-based approaches commonly involve resource-intensive iterative optimization procedures during inference, which reduces the efficiency and effectiveness of these approaches.

As the foregoing illustrates, what is needed in the art are more effective techniques for performing style transfer between different 3D shapes.

SUMMARY

One embodiment of the present invention sets forth a technique for performing style transfer. The technique includes determining a distribution associated with a plurality of style codes for a plurality of three-dimensional (3D) shapes, where each style code included in the plurality of style codes represents a difference between a first 3D shape and a second 3D shape, and where the second 3D shape is generated by applying one or more augmentations to the first 3D shape. The technique also includes sampling from the distribution to generate an additional style code and executing a first trained machine learning model based on the additional style code to generate an output 3D shape having one or more style-based attributes associated with the additional style code and one or more content-based attributes associated with an object. The technique further includes generating a 3D model of the object based on the output 3D shape.

One technical advantage of the disclosed techniques relative to the prior art is that, with the disclosed techniques, attributes pertaining to style in 3D shapes can be disentangled from attributes pertaining to content in 3D shapes via an arbitrary set of augmentations to the 3D shapes. In this regard, the augmentations can be selected to target or destroy certain features or attributes that constitute the "style" of a set of 3D shapes while preserving features or attributes that constitute the "content" of the 3D shapes. Consequently, the disclosed techniques enable precise control over the isolation and disentanglement of style features from content features within the internal representation of the machine learning model and allows the machine learning model to extract and transfer different combinations of attributes corresponding to different styles across 3D shapes. Another technical advantage of the disclosed techniques is that a machine learning model can be used to perform style transfer in a single forward pass. Accordingly, the disclosed techniques reduce resource overhead relative to conventional approaches that perform style transfer between 3D shapes using resource-intensive iterative optimization procedures. An additional technical advantage of the disclosed techniques is that the disclosed techniques enable the machine learning model to be trained in an unsupervised reconstruction task using a large set of training shapes, which allows the machine learning model to generalize to a variety of visual attributes corresponding to both the content and style associated with 3D shapes. These technical advantages provide one or more technological improvements over prior art approaches.

BRIEF DESCRIPTION OF THE DRAWINGS

So that the manner in which the above recited features of the various embodiments can be understood in detail, a more particular description of the inventive concepts, briefly summarized above, may be had by reference to various embodiments, some of which are illustrated in the appended drawings. It is to be noted, however, that the appended drawings illustrate only typical embodiments of the inventive concepts and are therefore not to be considered limiting of scope in any way, and that there are other equally effective embodiments.

FIG. 4A illustrates an exemplar architecture for the encoder of FIG. 2, according to various embodiments.

FIG. 4B illustrates an exemplar architecture for the style network of FIG. 2, according to various embodiments.

FIG. 4C illustrates an exemplar architecture for the decoder of FIG. 2, according to various embodiments.

DETAILED DESCRIPTION

In the following description, numerous specific details are set forth to provide a more thorough understanding of the various embodiments. However, it will be apparent to one of skill in the art that the inventive concepts may be practiced without one or more of these specific details.

System Overview

Figure 1:
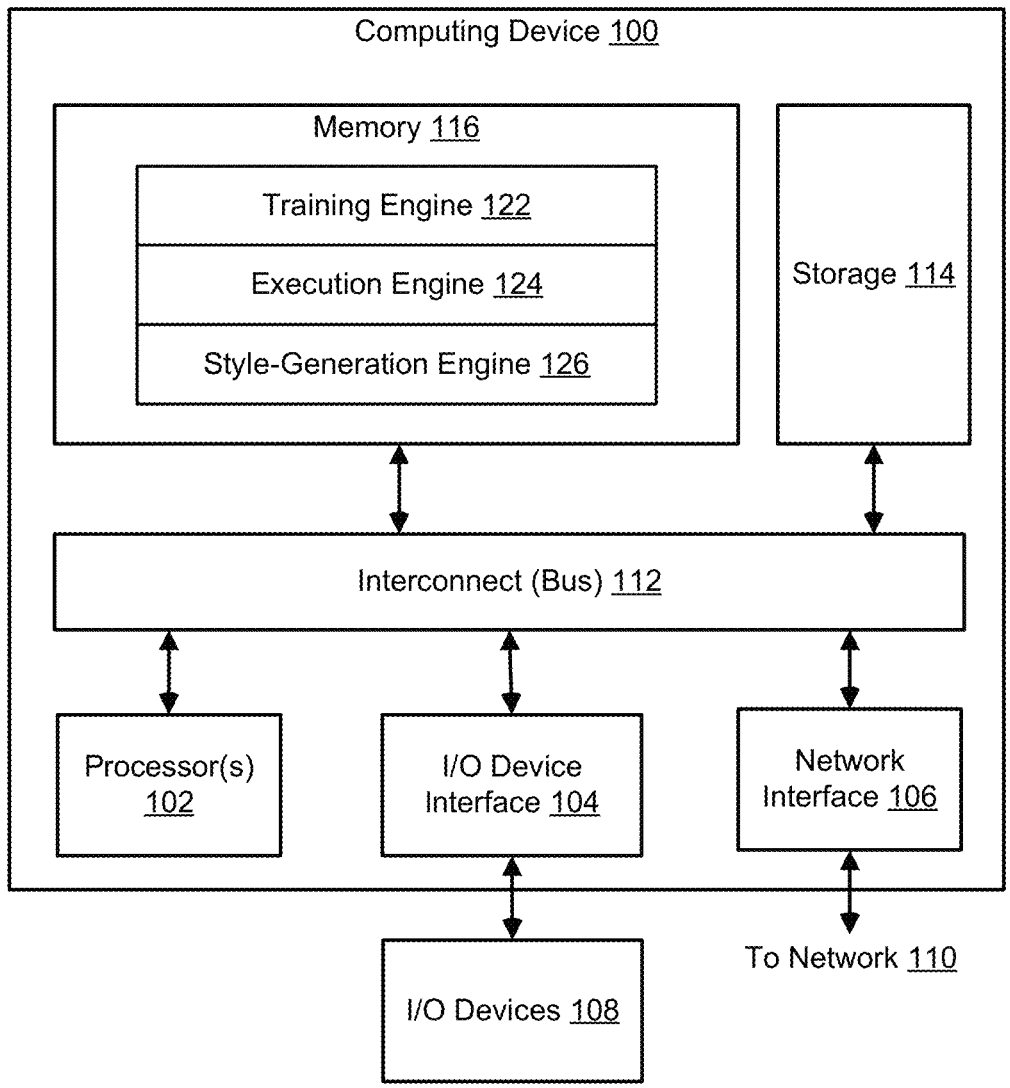
FIG. 1 illustrates a computing device configured to implement one or more aspects of various embodiments.

FIG. 1 illustrates a computing device 100 configured to implement one or more aspects of the present invention. Computing device 100 may be a desktop computer, a laptop computer, a smart phone, a personal digital assistant (PDA), tablet computer, or any other type of computing device configured to receive input, process data, and optionally display images, and is suitable for practicing one or more embodiments of the present invention. Computing device 100 is configured to run a training engine 122, an execution engine 124, and a style-generation engine 126 that reside in a memory 116.

It is noted that the computing device described herein is illustrative and that any other technically feasible configurations fall within the scope of the present invention. For example, multiple instances of training engine 122, execution engine 124, and style-generation engine 126 could execute on a set of nodes in a distributed and/or cloud computing system to implement the functionality of computing device 100.

In one embodiment, computing device 100 includes, without limitation, an interconnect (bus) 112 that connects one or more processors 102, an input/output (I/O) device interface 104 coupled to one or more input/output (I/O) devices 108, memory 116, a storage 114, and a network interface 106. Processor(s) 102 may be any suitable processor implemented as a central processing unit (CPU), a graphics processing unit (GPU), an application-specific integrated circuit (ASIC), a field programmable gate array (FPGA), an artificial intelligence (AI) accelerator, any other type of processing unit, or a combination of different processing units, such as a CPU configured to operate in conjunction with a GPU. In general, processor(s) 102 may be any technically feasible hardware unit capable of processing data and/or executing software applications. Further, in the context of this disclosure, the computing elements shown in computing device 100 may correspond to a physical computing system (e.g., a system in a data center) or may be a virtual computing instance executing within a computing cloud.

In one embodiment, I/O devices 108 include devices capable of receiving input, such as a keyboard, a mouse, a touchpad, and/or a microphone, as well as devices capable of providing output, such as a display device and/or speaker. Additionally, I/O devices 108 may include devices capable of both receiving input and providing output, such as a touchscreen, a universal serial bus (USB) port, and so forth. I/O devices 108 may be configured to receive various types of input from an end-user (e.g., a designer) of computing device 100, and to also provide various types of output to the end-user of computing device 100, such as displayed digital images or digital videos or text. In some embodiments, one or more of I/O devices 108 are configured to couple computing device 100 to a network 110.

In one embodiment, network 110 is any technically feasible type of communications network that allows data to be exchanged between computing device 100 and external entities or devices, such as a web server or another networked computing device. For example, network 110 could include a wide area network (WAN), a local area network (LAN), a wireless (WiFi) network, and/or the Internet, among others.

In one embodiment, storage 114 includes non-volatile storage for applications and data, and may include fixed or removable disk drives, flash memory devices, and CD-ROM, DVD-ROM, Blu-Ray, HD-DVD, or other magnetic, optical, or solid-state storage devices. Training engine 122, execution engine 124, and style-generation engine 126 may be stored in storage 114 and loaded into memory 116 when executed.

In one embodiment, memory 116 includes a random access memory (RAM) module, a flash memory unit, or any other type of memory unit or combination thereof. Processor(s) 102, I/O device interface 104, and network interface 106 are configured to read data from and write data to memory 116. Memory 116 includes various software programs that can be executed by processor(s) 102 and application data associated with said software programs, including training engine 122, execution engine 124, and style-generation engine 126.

In some embodiments, training engine 122, execution engine 124, and style-generation engine 126 include functionality to train and execute a machine learning model to perform style transfer in three-dimensional (3D) shapes. More specifically, style transfer in 3D shapes involves generating an output 3D shape that has the "content" (e.g., structure, semantic meaning, etc.) of an input 3D shape and a "style" (e.g., curves, corners, angles, dimensions, proportions, fine-grained details, etc.) that is distinct from that of the input 3D shape.

As described in further detail below, training engine 122, execution engine 124, and style-generation engine 126 train and execute the machine learning model in a way that allows attributes pertaining to style to be disentangled from attributes pertaining to content via an arbitrary set of augmentations to a 3D shape, thereby allowing "style" to be defined or controlled via the features or attributes that are separated from the 3D shape via the set of augmentations. Further, the machine learning model can be used to perform style transfer in a single forward pass instead of requiring resource-intensive iterative optimization procedures, thereby reducing resource overhead over conventional machine-learning-based techniques for performing style transfer in 3D shapes.

Neural Style Transfer in Three-Dimensional Shapes

Figure 2:
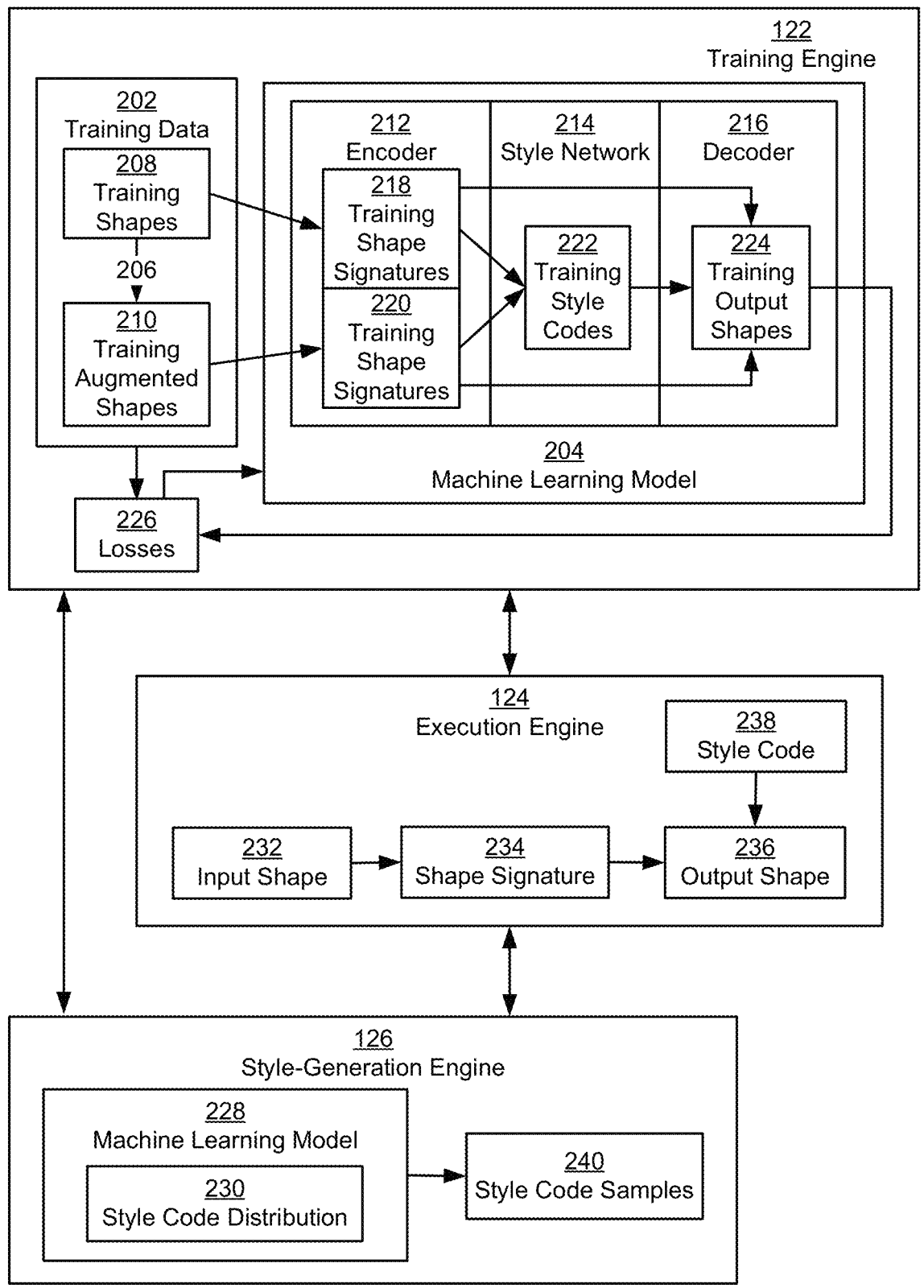
FIG. 2 includes more detailed illustrations of the training engine, execution analysis engine, and style-generation engine of FIG. 1, according to various embodiments.

FIG. 2 includes more detailed illustrations of training engine 122, execution engine 124, and style-generation engine 126 of FIG. 1, according to various embodiments. As mentioned above, training engine 122, execution engine 124, and style-generation engine 126 operate to train and execute a machine learning model 204 that converts an input shape 232 into an output shape 236 that retains the content of input shape 232 but depicts a style that is distinct from that of input shape 232.

In one or more embodiments, the content associated with a shape includes the structure that defines an object represented by the shape, a geometric or spatial arrangement of lines or curves that are representative of the object, and/or another semantic component of the shape that is indicative of the object represented by the shape. For example, the content associated with a 3D shape representing a car could include structures and/or geometrical arrangements that are indicative of a body, wheels, doors, windows, hood, trunk, and/or other components of a car.

In some embodiments, the style associated with a shape is defined based on self-consistency, in which the shape consistently has the same style at different spatial locations. Additionally, the style corresponds to visual details in the shape that are "disentangled" from the content associated with the shape by applying one or more augmentations 206 to the shape. Continuing with the above example, augmentations 206 could include (but are not limited to) smoothing and/or coarsening transformations that are applied to a shape representing a car. The smoothing and/or coarsening transformations could cause curves, corners, proportions, angles, and/or other visual attributes that are indicative of the "style" of the car to be removed. At the same time, the smoothing and/or coarsening transformations could be selected and/or performed in a way that retains the structures and/or geometrical arrangements that allow the shape to be recognized as a car.

More specifically, a given shape can be denoted by $x_1$, the content associated with the shape can be denoted by $C_{x_1}$, and the style associated with the shape can be denoted by $S_{x_1}$. The style can be captured as a nonlinear function of the difference between high-dimensional multi-scale local features that are expressed as a function $\varepsilon$ of the 3D (i.e., xyz) coordinates of $x_1$ and the transformed version of the shape $x_2 = T(x_1)$, where T denotes a transformation (i.e., one or more augmentations 206) that retains the content of the shape but alters the style of the shape (i.e., $T(x_1) \in C_{x_1}$ and $T(x_1) \notin S_{x_1}$). Additionally, an arbitrary number N of augmentations 206 $\mathcal{T} = \cup_{i=2}^{N+1} T_i$ can be applied to the shape $x_1$ to produce the same number of transformed shapes (i.e., $x_i = T_i(x_1)$ for i=2 . . . N+1). Consequently, the visual attributes pertaining to the style of the shape can be controlled by selecting and/or varying the set of augmentations 206 used to separate the style from the content of the shape.

As shown in FIG. 2, machine learning model 204 includes an encoder 212, a style network 214, and a decoder 216. Each of encoder 212, style network 214, and decoder 216 includes a series of neural network layers that process one or more inputs and generate one or more corresponding outputs.

Encoder 212 implements the function E that transforms a given input shape 232 into a corresponding shape signature 234 that includes high-dimensional multi-scale local features for 3D coordinates of that input shape 232. In some embodiments, input shape 232 $x_1$ is represented by a grid of signed distance function (SDF) values grid $x_1^{grid}$ at a certain resolution (e.g., $32^3$ to $128^3$), as well as a point cloud $x_1^{Pxyz}$ of 3D points xyz sampled near the surface of input shape 232. The SDF values are computed using the function $f(x) = \mathbf{1}_\mathcal{M} \min_{y \in \partial \mathcal{M}} \|x-y\|_2$, where $f: \mathbb{R}^3 \mapsto \mathbb{R}$, $\mathcal{M}$ denotes a 3D shape, $\mathbf{1}_\mathcal{M}$ is an indicator function that has a value of 1 for a point outside of the 3D shape and a value of −1 for a point inside the 3D shape, and $\partial \mathcal{M}$ is the surface (or boundary) of the 3D shape. The point cloud can be generated by sampling points on the surface of the 3D shape and adding a small displacement (i.e., $\mathcal{N}(0, \sigma I)$, where $\sigma$ is chosen to reflect the dataset of 3D shapes used with machine learning model 204) to each sampled point.

The SDF values in the grid can alternatively be replaced by occupancy values that encode the probability of a point being inside or outside the 3D shape (i.e., $f \mathbb{R}^3 \mapsto [0,1]$). These occupancy values can be computed by thresholding the corresponding SDF values.

More specifically, encoder 212 $\varepsilon$ accepts input that includes the grid of SDF values $x_1^{grid}$ and the point cloud $x_1^{Pxyz}$ for a given input shape 232 $x_1$. For example, a point cloud of 2048 points could be represented using a 2048×3 matrix, where each row of the matrix stores three values corresponding to the x, y, and z coordinates of a corresponding point. A $32^3$ grid of SDF values could be represented by a vector of 32,768 values, where each value denotes the distance between a corresponding point in the grid to the closest point on the surface of input shape 232.

In response to the input, encoder 212 computes a corresponding shape signature 234 that includes a multi-scale feature representation for each point in the point cloud.

Continuing with the above example, encoder 212 could apply 3D convolutional blocks followed by max pooling layers to the $32^3$ grid of SDF values to compute three grids of latent features at the corresponding resolutions of $16^3$, $8^3$, and $4^3$. Encoder 212 could also compute three sets of latent features at the same resolutions for each point $P_{xyz}$ in the point cloud via trilinear interpolation of latent features at grid points that are closest to the point. The multi-scale latent features could then be concatenated with the coordinates of the point to form a corresponding shape signature 234 for input shape 232. This shape signature could be represented using a 2048×(3+3*N) matrix, where each row of the matrix includes the three values corresponding to the x, y, and z coordinates of a corresponding point in the point cloud followed by three sets of latent features (each of size N) computed for the point. Decoder 216 is denoted by D and converts a given shape signature 234 into SDF values (or occupancy values) for the corresponding points. Continuing with the above example, input into decoder 216 could include the 2048×(3+3*N) matrix of point locations and latent features outputted by encoder 212. In response to the input, decoder 216 could use a series of neural network layers to generate an SDF value (or occupancy value) for each of the 2048 points in the point cloud.

Style network 214 is denoted by S and generates a style code 238 that represents the difference between two shapes, given input that includes shape signatures for the two shapes. For example, style network 214 could use a series of fully connected layers and/or other types of neural network layers to convert an aggregation of the shape signatures into a latent vector corresponding to style code 238. As described in further detail below, a given style code 238 can be inputted with a given shape signature 234 into decoder 216 to generate a corresponding output shape 236 that includes the content of the shape represented by shape signature 234 and the style represented by style code 238.

In some embodiments, the two shapes for which a given style code 238 is generated include a first shape $x_1$ that includes a first set of attributes corresponding to content $C_{x1}$ and a second set of attributes corresponding to style $S_{x1}$. The two shapes also include a second shape $x_2$ that includes the same content-based attributes $C_{x1}$ of the first shape but lacks the style-based attributes $S_{x1}$ of the first shape. As mentioned above, the second shape can be generated by applying an arbitrary number and/or set of augmentations to the first shape. Additionally, these augmentations can be selected and/or varied to control for a particular set of style-based attributes $S_{x1}$ to be extracted from the first shape. The operation and structure of encoder 212, style network 214, and decoder 216 are described in further detail below with respect to FIGS. 3A, 3B, 4A, 4B, and 4C.

In one or more embodiments, training engine 122 trains encoder 212, style network 214, and decoder 216 using training data 202 that includes a set of training shapes 208 and a corresponding set of augmented training shapes 210. As shown in FIG. 2, augmented training shapes 210 are generated by applying one or more augmentations 206 to the corresponding training shapes 208. For example, smoothing and/or coarsening augmentations 206 could be applied to each of training shapes 208 to generate a corresponding set of augmented training shapes 210.

Training engine 122 uses encoder 212 to convert the set of training shapes 208 into a first set of training shape signatures 218. Training engine 122 also uses encoder 212 to convert the set of augmented training shapes 210 into a second set of training shape signatures 220. Training engine 122 uses style network 214 to generate training style codes 222 from pairs of training shape signatures, where each pair of training shape signatures includes a first training shape signature representing a training shape (in training shapes 208) and a second training shape signature representing an augmented training shape (in augmented training shapes 210) that is produced by applying augmentations 206 to the training shape. Training engine 122 additionally uses decoder 216 to convert training shape signatures 218, training shape signatures 220, and/or training style codes 222 into training output shapes 224. Training engine 122 then computes one or more losses 226 associated with training output shapes 224 and updates parameters of encoder 212, style network 214, and decoder 216 based on losses 226.

Figure 3A:
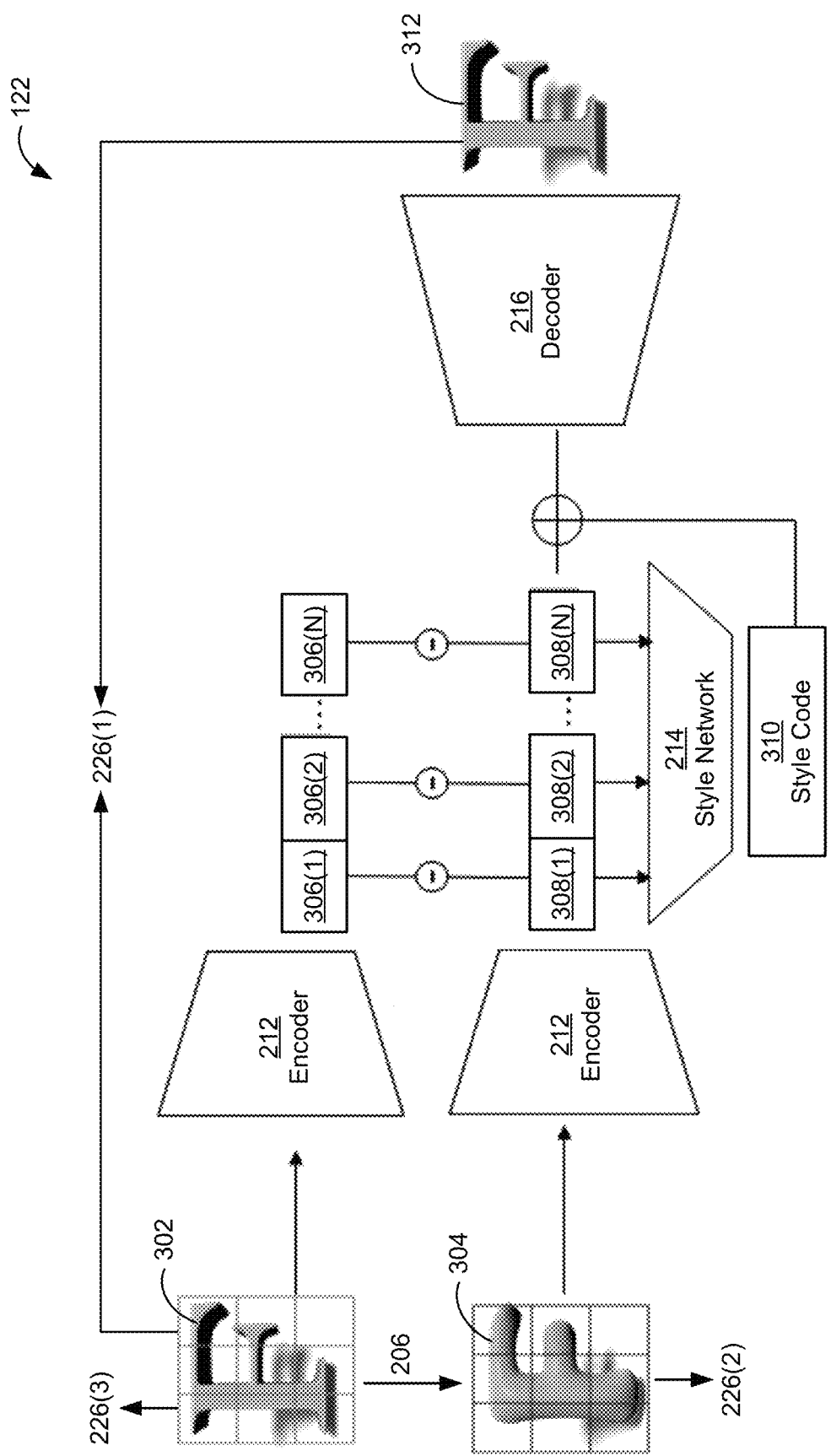
FIG. 3A illustrates the exemplar operation of the training engine of FIG. 1 in generating a trained encoder, style network, and decoder, according to various embodiments.

FIG. 3A illustrates the exemplar operation of training engine 122 of FIG. 1 in generating a trained encoder 212, style network 214, and decoder 216, according to various embodiments. As shown in FIG. 3A, training engine 122 applies one or more augmentations 206 to a first shape 302 corresponding to the letter "F" in a specific font to generate a second shape 304 that still corresponds to the letter "F" but lacks visual attributes associated with the font. For example, training engine 122 could apply a smoothing and/or coarsening augmentation to shape 302 to produce shape 304. Both shapes 302 and 304 include a recognizable arrangement of lines, angles, polygons, polyhedra, contours, and/or other visual attributes pertaining to the letter "F." However, shape 302 includes additional details (e.g., serifs, geometry, corners, thickness, width, etc.) that are indicative of the style represented by the font, while shape 304 lacks these details.

Training engine 122 inputs a representation of each shape 302 and 304 into the same encoder 212. In response to the inputted representation of shape 302, encoder 212 generates multiple sets of features 306(1)-306(N) (each of which is referred to individually as features 306) at different resolutions. Similarly, in response to the inputted representation of shape 304, encoder 212 generates multiple sets of features 308(1)-308(N) (each of which is referred to individually as features 308) at different resolutions. Features 306 correspond to a training shape signature (e.g., in training shape signatures 218) for shape 302, and features 308 correspond to a training shape signature (e.g., in training shape signatures 220) for shape 304.

As mentioned above, the representation of each shape 302 and 304 includes a grid of SDF values at a certain resolution, as well as a point cloud of 3D points sampled near the surface of that shape. Encoder 212 applies 3D convolutional blocks, max pooling layers, and/or other types of neural network layers to the grid of SDF values to compute multiple sets of latent features at different resolutions. For each set of latent features and each point in the point cloud, encoder 212 generates a corresponding set of features for that point by interpolating the latent features that are closest to that point. Training engine 122 then populates a matrix with rows representing points in the point cloud and stores multiple sets of interpolated latent features (e.g., features 306 for shape 302 and features 308 for shape 304) for each point in the corresponding row.

After features 306 and 308 are generated by encoder 212 from the corresponding shapes 302 and 304, training engine 122 aggregates features 306 and 308. For example, training engine 122 could aggregate features 306 and 308 by subtracting each set of features 308 associated with a certain resolution from a corresponding set of features 306 associated with the same resolution. Training engine 122 could also, or instead, input features 306 and 308 into a multilayer perceptron and/or another type of neural network and obtain an aggregation of both sets of features 306 and 308 as the output of the neural network.

Training engine 122 inputs the aggregation of features 306 and 308 into style network 214. Style network 214 converts the input into a style code 310 (e.g., in training style codes 222) that encodes the similarities and/or differences in features 306 and 308. For example, style network 214 could include fully connected layers, max pooling layers, and/or other types of neural network layers that generate, from the aggregation of features 306 and 308, a latent vector corresponding to style code 310. The dimensionality of style code 310 could be lower than, equal to, or higher than that of features 306 and 308.

Training engine 122 uses features 306 and 308 and style code 310 to generate multiple sets of input into decoder 216. In particular, training engine 122 combines style code 310 with features 308 associated with shape 304 to generate a first set of input into decoder 216. For example, training engine 122 could generate the first set of input by concatenating style code 310 with features 308, adding style code 310 to some or all features 308, and/or using a multilayer perceptron and/or another type of neural network to convert style code 310 and features 308 into an aggregated representation. Training engine 122 also uses features 306 as a second set of input into decoder 216 and uses features 308 as a third set of input into decoder 216.

Training engine 122 uses decoder 216 to convert each set of input into a corresponding output. As shown in FIG. 3A, training engine 122 uses decoder 216 to convert the first set of input, which includes an aggregation of features 308 and style code 310, into a shape 312 that corresponds to a reconstruction of shape 302. Training engine 122 also uses decoder 216 to convert the second set of input, which includes features 306 associated with shape 302, into a shape (not shown) that corresponds to a reconstruction of that shape 302. Training engine 122 further uses decoder 216 to convert the third set of input, which includes features 308 associated with shape 304, into a shape (not shown) that corresponds to a reconstruction of that shape 304.

Training engine 122 additionally computes three losses 226(1), 226(2), and 226(3) (each of which is referred to individually as loss 226) associated with the three sets of input and the three corresponding outputs. More specifically, training engine 122 computes a first loss 226(1) between shape 302 and shape 312 outputted by decoder 216 from the aggregation of features 308 and style code 310. Training engine 122 also computes a second loss 226(2) between shape 302 and the shape (not shown) outputted by decoder 216 from features 306. Training engine 122 further computes a third loss 226(3) between shape 304 and the shape (not shown) outputted by decoder 216 from features 308. Training engine 122 also uses a training technique (e.g., gradient descent and backpropagation) to update parameters of encoder 212, style network 214, and decoder 216 based on the computed losses 226.

In some embodiments, losses 226 include the following representation:

$$\mathcal{L}_{total} = \mathcal{L}_{SDF} \mathcal{L}_{x_1} \mathcal{L}_{x_2} \qquad (1)$$

In the above representation, $\mathcal{L}_{total}$ corresponds to a composite loss that is used to train encoder 212, style network 214, and decoder 216; $\mathcal{L}_{SDF}$ corresponds to loss 226(1); $\mathcal{L}_{x_1}$ corresponds to loss 226(2); and $\mathcal{L}_{x_2}$ corresponds to loss 226(3).

Loss 226(1) includes the following representation:

$$\mathcal{L}_{SDF} = \mathbb{E}_{(x_1, x_2) \in X} \| \mathcal{D}_{(\varepsilon(x_2) \oplus \mathcal{S}_{(\varepsilon(x_1), \varepsilon(x_2))} -} SDF_{x_1} \|_1 \qquad (2)$$

In the above representation, $x_1$ represents shape 302, $x_2$ represents shape 304, $\mathcal{D}$ represents decoder 216, $\varepsilon$ represents encoder 212, and $\mathcal{S}$ represents style network 214. Additionally, $\oplus$ denotes the concatenation operator, $SDF_{x_1}$ denotes the set of SDF values for the point cloud of points sampled near the surface of shape 302, and $\mathbb{E}_{(x_1, x_2) \in X}$ is the expectation over pairs of training shapes 208 and augmented training shapes 210 (including the pair formed from shape 302 and shape 304) in training data 202. As a result, loss 226(1) corresponds to a reconstruction loss that is computed between shape 302 and shape 312, where shape 312 is generated by decoder 216 based on a concatenation of features 308 outputted by encoder 212 from shape 304 and style code 310 generated by style network 214 from an aggregation of features 306 and 308.

Loss 226(2) includes the following representation:

$$\mathcal{L}_{x_1} = \mathbb{E}_{x_1 \in X} \| \mathcal{D}_{(\varepsilon(x_1))} - SDF_{x_1} \|_1 \qquad (3)$$

In the above representation, $\mathbb{E}_{x_1 \in X}$ represents the expectation over the training distribution of training shapes 208, which include shape 302. Consequently, loss 226(2) corresponds to a reconstruction loss that is computed between shape 302 and an output shape (not shown), where the output shape is generated by decoder 216 based on features 306 outputted by encoder 212 from shape 302.

Loss 226(3) includes the following representation:

$$\mathcal{L}_{x_2} = \mathbb{E}_{x_2 \in X} \| \mathcal{D}_{(\varepsilon(x_2))} - SDF_{x_2} \|_1 \qquad (3)$$

In the above representation, $\mathcal{L}_{x_2 \in X}$ represents the expectation over the training distribution of augmented training shapes 210, which include shape 304. Consequently, loss 226(3) corresponds to a reconstruction loss that is computed between shape 304 and an output shape (not shown), where the output shape is generated by decoder 216 based on features 308 outputted by encoder 212 from shape 304.

Returning to the discussion of FIG. 2, after machine learning model 204 is trained, execution engine 124 uses one or more components of machine learning model 204 to perform style transfer for additional 3D shapes. As mentioned above, style transfer in a 3D shape involves converting a given input shape 232 into a corresponding output shape 236 that retains the content of input shape 232 but depicts a style that is distinct from that of input shape 232.

More specifically, execution engine 124 obtains a given input shape 232 as a representation of content associated with output shape 236. For example, execution engine 124 could use one or more augmentations 206 to convert a different shape into input shape 232. Alternatively, input shape 232 could correspond to a shape that is generated without applying augmentations 206 to another shape (e.g., using a generative design program).

Execution engine 124 uses the trained encoder 212 to convert input shape 232 into a corresponding shape signature 234. Execution engine 124 also uses the trained style network 214 to generate style code 238 from features associated with a shape and an augmented version of the shape. Execution engine 124 alternatively, or additionally, retrieves a given style code 238 that was generated previously (e.g., during training of machine learning model 204 and/or during a previous round of inference using the trained machine learning model 204) from a lookup table and/or another data store. In both instances, style code 238 corresponds to an encoded representation of a style associated with a shape, where the style corresponds to visual attributes that are removed from the shape via one or more augmentations 206 applied to the shape.

Execution engine 124 inputs shape signature 234 and style code 238 into decoder 216 and uses decoder 216 to convert the input into a corresponding output shape 236. This output shape 236 includes content-based attributes associated with the content of input shape 232 and style-based attributes associated with the style represented by style code 238.

Figure 3B:
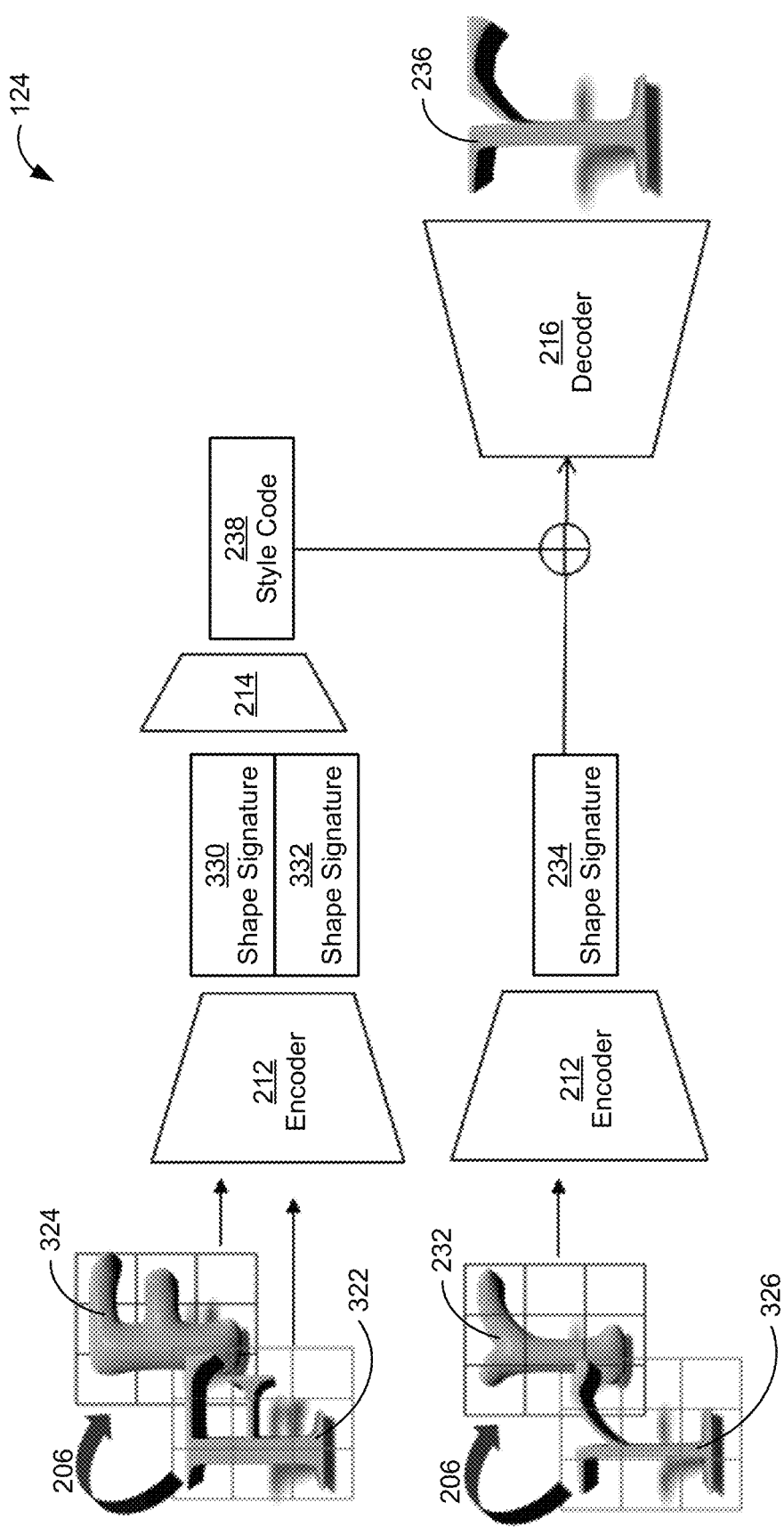
FIG. 3B illustrates the exemplar operation of the execution engine of FIG. 1 in generating an output shape that includes one or more content-based attributes of an input shape and one or more style-based attributes associated with a style code, according to various embodiments.

FIG. 3B illustrates the exemplar operation of the execution engine 124 of FIG. 1 in generating output shape 236 that includes one or more content-based attributes of input shape 232 and one or more style-based attributes associated with style code 238, according to various embodiments. As shown in FIG. 3B, execution engine 124 applies one or more augmentations 206 to a first shape 322 corresponding to the letter "F" in a specific font to generate a second shape 324 that still corresponds to the letter "F" but lacks visual attributes associated with the font. For example, execution engine 124 could apply a smoothing and/or coarsening augmentation to shape 322 to produce shape 324. Both shapes 322 and 324 include a recognizable arrangement of lines, angles, polygons, polyhedra, contours, and/or other visual attributes pertaining to the letter "F." However, shape 322 includes additional details (e.g., serifs, geometry, corners, thickness, width, etc.) that are indicative of the style represented by the font, while augmented shape 324 lacks these details.

Execution engine 124 inputs a representation of each shape 322 and 324 into the same encoder 212. In response to the inputted representation of shape 322, encoder 212 generates a shape signature 330 that includes multiple sets of features (not shown) at different resolutions. Similarly, in response to the inputted representation of shape 304, encoder 212 generates a separate shape signature 332 that includes multiple sets of features (not shown) at different resolutions.

As mentioned above, the representation of each shape 322 and 324 includes a grid of SDF values at a certain resolution, as well as a point cloud of 3D points sampled near the surface of that shape. Encoder 212 applies 3D convolutional blocks, max pooling layers, and/or other types of neural network layers to the grid of SDF values to compute multiple sets of latent features at different resolutions. For each set of latent features and each point in the point cloud, encoder 212 generates a corresponding set of features for that point by interpolating the latent features that are closest to that point. Execution engine 124 further generates a shape signature for the shape by populating a matrix with rows representing points in the point cloud and storing multiple sets of interpolated latent features for each point in the corresponding row.

After shape signatures 330 and 332 are generated by encoder 212 from the corresponding shapes 322 and 324, execution engine 124 aggregates shape signatures 330 and 332. For example, execution engine 124 could compute a difference between shape signatures 330 and 332 by subtracting one shape signature from another. Execution engine 124 could also, or instead, input shape signatures 330 and 332 into a multilayer perceptron and/or another type of neural network and obtain an aggregation of both shape signatures 330 and 332 as the output of the neural network.

Execution engine 124 also inputs the aggregation of shape signatures 330 and 332 into style network 214. Style network 214 converts the input into a corresponding style code 238 that encodes the similarities and/or differences in visual attributes represented by shape signatures 330 and 332. For example, style network 214 could include fully connected layers, max pooling layers, and/or other types of neural network layers that generate, from the aggregation of shape signatures 330 and 332, a latent vector corresponding to style code 238. The dimensionality of style code 238 could be lower than, equal to, or higher than that of shape signatures 330 and 332.

Execution engine 124 also applies augmentations 206 to a different shape 326 corresponding to the letter "r" in a specific font to generate an input shape 232 that still corresponds to the letter "r" but lacks visual attributes associated with the font. For example, execution engine 124 could apply a smoothing and/or coarsening augmentation to shape 326 to produce input shape 232. Both shapes 326 and 232 include a recognizable arrangement of lines, angles, polygons, polyhedra, contours, and/or other visual attributes pertaining to the letter "r." However, shape 326 includes additional details (e.g., serifs, geometry, corners, thickness, width, etc.) that are indicative of the style represented by the font, while input shape 232 lacks these details.

In some embodiments, input shape 232 is generated without applying augmentations 206 to another shape (e.g., shape 326). For example, input shape 232 could include a 3D model of a vehicle, piece of furniture, building, 3D structure, and/or another type of object that is outputted by a generative design program. In these embodiments, augmentations 206 applied to shapes 322 and 324 from which style code 238 is generated are selected so that shape 324 includes style-based attributes that resemble those of input shape 232 to which the style associated with style code 238 is to be applied.

Continuing with the above example, execution engine 124 and/or another component could obtain a set of 3D models corresponding to generative designs produced by the generative design program. The component could also apply various types and/or combinations of augmentations to a different set of 3D models that were produced by entities and/or techniques other than the generative design program (e.g., 3D models generated by designers, 3D models of real-world objects or designs, etc.) to generate multiple sets of augmented 3D models. For each set of 3D models, the component could compute statistics, correlations, aggregations, and/or other values from a set of shape signatures (not shown) outputted by style network 214 and/or feature maps generated by a different neural network from the 3D models. The computed values could represent style-based attributes associated with the corresponding set of 3D models. The component could compute a "distance" and/or another measure of similarity between the values associated with the generative designs and the values associated with each set of augmented 3D models. The component could use this measure to identify the set of augmented 3D models with the highest similarity to the generative designs and identify the particular set of augmentations 206 used to produce the set of augmented 3D models. The component could then apply the identified set of augmentations 206 to shapes (e.g., shape 322) with styles that differ from those of generative designs to produce augmented shapes (e.g., shape 324) with styles that resemble those of generative designs, thereby allowing the corresponding style codes (e.g., style code 238) to represent style-based attributes that can used to transfer styles to generative designs.

As with shapes 322 and 324, execution engine 124 uses encoder 212 to convert input shape 232 into a corresponding shape signature 234 that includes multiple sets of features (not shown) at different resolutions. For example, execution engine 124 could determine and/or receive a grid of SDF values at a certain resolution for input shape 232 and a point cloud of 3D points sampled near the surface of input shape 232. Execution engine 124 could also apply 3D convolutional blocks, max pooling layers, and/or other types of neural network layers in encoder 212 to the grid of SDF values to compute multiple sets of latent features at different resolutions. For each set of latent features and each point in the point cloud, execution engine 124 could generate a corresponding set of features for that point by interpolating the latent features that are closest to that point. Execution engine 124 could then populate a matrix with rows representing points in the point cloud and store multiple sets of interpolated latent features for each point in the corresponding row.

Execution engine 124 generates input into decoder 216 by combining style code 238 with shape signature 234 associated with shape 232. For example, execution engine 124 could concatenate style code 238 and shape signature 234, add style code 238 to shape signature 234, and/or use a multilayer perceptron and/or another type of neural network to convert style code 238 and shape signature 234 into an aggregated representation.

Execution engine 124 uses decoder 216 to convert the inputted aggregation of shape signature 234 and style code 238 into a corresponding output shape 236. For example, execution engine 124 could obtain output shape 236 as predicted SDF values and/or occupancy values for points in the point cloud sampled near the surface of input shape 232. Execution engine 124 could use a marching cubes technique and/or another technique to reconstruct the surface of output shape 236 from the predicted SDF and/or occupancy values and corresponding point locations.

As shown in FIG. 3B, output shape 236 includes the content of input shape 232 (i.e., attributes that allow both input shape 232 and output shape 236 to be recognized as the letter "r") and the style associated with shape 322 (e.g., visual attributes that characterize the font associated with shape 322) from which style code 238 was derived. Consequently, output shape 236 corresponds to the result obtained when the style of shape 322 is transferred to shape 232.

Returning to the discussion of FIG. 2, style-generation engine 126 includes functionality to generate style code samples 240 that are separate from training style codes 222 associated with pairs of training shapes 208 and augmented training shapes 210 and/or additional style codes outputted by style network 214 after training of style network 214 is complete. More specifically, style-generation engine 126 uses another machine learning model 228 to learn a style code distribution 230 associated with style codes outputted by style network 214. Style-generation engine 126 also samples from style code distribution 230 to generate style code samples 240 that are distinct from style codes outputted by style network 214. Each of style code samples 240 represents a "new" style that is not explicitly extracted from a shape inputted into machine learning model 204. Style-generation engine 126 can provide style code samples 240 to execution engine 124 for use in performing style transfer using the corresponding new styles.

In one or more embodiments, style code distribution 230 is generated from an arbitrary number of existing style codes outputted by style network 214. When style code distribution 230 is formed from a relatively small number of style codes, style-generation engine 126 can use machine learning model 228 to generate style code samples 240 by interpolating between or among the style codes, averaging the style codes, and/or otherwise combining the style codes. For example, style-generation engine 126 could generate a style code sample that represents the overall style associated with a font by averaging style codes associated with characters in that font. In another example, style-generation engine 126 could interpolate between two or more style codes associated with two or more fonts to generate a style code sample that corresponds to a mix or blend of the styles associated with the fonts.

When a large number of style codes is available, style-generation engine 126 can train machine learning model 228 to learn a more complex style code distribution 230, given the set of style codes. For example, style-generation engine 126 could train one or more components of a generative adversarial network, variational autoencoder, normalizing flow, energy-based model, diffusion model, Gaussian mixture model, hidden Markov model, and/or another type of generative model to learn a latent manifold corresponding to style code distribution 230 within the latent space occupied by style codes generated by style network 214.

After training of machine learning model 228 is complete, style-generation engine 126 can use various techniques to generate style code samples 240 from style code distribution 230, as learned by machine learning model 228. For example, style-generation engine 126 could use machine learning model 228 to convert one or more randomized inputs (e.g., samples from a base distribution) into one or more corresponding style code samples 240 from style code distribution 230. In another example, style-generation engine 126 could be used to generate style code samples 240 from the region of the latent manifold corresponding to style code distribution 230 based on two or more input style codes (or pairs of shapes converted into style codes) that represent the boundaries of the manifold.

Style-generation engine 126 can additionally train and/or execute machine learning model 228 so that style code samples 240 and/or style code distribution 230 are conditioned on additional input. Continuing with the above example, the additional input could include text-based prompts and/or other types of descriptions of style-based attributes of 3D shapes. Style-generation engine 126 could use a contrastive learning technique to train the machine learning model using "positive" and "negative" pairs of style codes and descriptions. A "positive" pair could include a style code and a description of the style-based attributes associated with the style code, and a "negative" pair could include a style code and a description of style-based attributes that are not associated with the style code. The embedding space associated with the style codes in the pairs could correspond to the latent space of the style codes outputted by style network 214, and the embedding space associated with the descriptions could correspond to a separate latent space learned by machine learning model 228. The contrastive learning technique could include a max margin contrastive loss, triplet loss, N-pair loss, and/or another type of contrastive loss that causes machine learning model 228 to maximize the similarity of a style code and an embedding of a description when the style code and description belong to a positive pair. This loss would also cause machine learning model 228 to minimize the similarity of a style code and an embedding of a description when the style code and description belong to a negative pair. After machine learning model 228 has been trained, an additional description could be provided as input to machine learning model 228, and machine learning model 228 could use the input to generate a style code sample that captures the style-based attributes in the description. Multiple descriptions and/or permutations or combinations of descriptions and style codes could also be used to explore a corresponding region of a manifold associated with style code distribution 230 and generate one or more style code samples 240 within that region.

In another example, style network 214 could generate a hierarchical representation of style codes from pairs of shapes and corresponding augmented shapes. Lower levels of this hierarchical representation could correspond to larger-scale details associated with style-based attributes extracted from the pairs of shapes, and higher levels of this hierarchical representation could correspond to finer-grained details associated with the style-based attributes. Style-generation engine 126 could structure and/or train machine learning model 228 so that machine learning model 228 learns a separate style code distribution 230 and/or a separate portion of the same style code distribution 230 for each level of the hierarchical representation. After machine learning model 228 is trained, style-generation engine 126 could perform "style mixing" that samples the learned style code distribution(s) and/or portions of style code distribution 230 to generate multiple style code samples 240 corresponding to different levels of the hierarchical representation. Style-generation engine 126 could then combine these style code samples 240 into an overall style to be applied to a given input shape 232. Style-generation engine 126 could also, or instead, generate style code samples 240 from a subset of the levels in the hierarchical representation and combine style code samples 240 with specific latent values for remaining levels of the hierarchical representation. The resulting overall style would include "known" style-based attributes associated with the specific latent values and "randomized" style-based attributes associated with style code samples 240. Style-generation engine 126 could also, or instead, generate a style code sample for a given level of the hierarchical representation by "exploring" a region within the corresponding style code distribution 230 (or portion of style code distribution 230) based on two or more input style codes (or pairs of shapes converted into style codes) denote the boundaries of the region.

FIG. 4A illustrates an exemplar architecture for encoder 212 of FIG. 2, according to various embodiments. As shown in FIG. 4A, the architecture includes various 3D convolutional layers denoted by "Conv3D," as well as max pooling layers denoted by "MaxPool." In some embodiments, the convolutional layers include a leaky rectified linear unit (LReLU) activation function, which outputs a linear combination of the inputs if the linear combination is greater than or equal to zero and the linear combination scaled by a non-zero gradient if the linear combination is less than zero.

More specifically, the exemplar encoder 212 of FIG. 4A includes 13 total layers. The first layer is a 3D convolutional layer with 16 filters, a kernel size of 3, and a stride of 1. The second layer is a max pooling layer with a pooling region of size 2. The third and fourth layers are 3D convolutional layers with 32 filters, a kernel size of 3, and a stride of 1. The fifth layer is a max pooling layer with a pooling region of size 2. The sixth and seventh layers are 3D convolutional layers with 64 filters, a kernel size of 3, and a stride of 1. The eighth layer is a max pooling layer with a pooling region of size 2. The ninth and tenth layers are 3D convolutional layers with 128 filters, a kernel size of 3, and a stride of 1. The eleventh layer is a max pooling layer with a pooling region of size 2. The twelfth and thirteenth layers are 3D convolutional layers with 128 filters, a kernel size of 3, and a stride of 1.

As mentioned above, encoder 212 is used to generate multiple sets of latent features at multiple resolutions from a grid of SDF values and/or occupancy values for a given shape (e.g., input shape 232 of FIG. 2). More specifically, the exemplar architecture of encoder 212 includes multiple sequences of convolutional layers followed by max pooling layers that generate, from the grid of SDF values and/or occupancy values, multiple grids of latent features at gradually decreasing resolutions. Latent features at higher resolutions capture fine-grained shape details associated with the shape, and latent features at lower resolutions capture the overall structure associated with the shape.

Each grid of latent features at a certain resolution is used to generate a corresponding set of latent features for each point in a point cloud sampled in the vicinity of the surface of the shape. For example, encoder 212 could generate M grids of latent features at M corresponding resolutions from the inputted grid of SDF and/or occupancy values. After a given grid of latent features is produced by encoder 212, a corresponding set of latent features could be generated for each point in the point cloud via trilinear interpolation of the latent features for a subset of points in the grid that are closest to the point in the point cloud. Thus, each point in the point cloud would also be associated with M sets of latent features.

FIG. 4B illustrates an exemplar architecture for style network 214 of FIG. 2, according to various embodiments. As shown in FIG. 4B, the architecture includes various fully connected layers denoted by "FC," as well as a max pooling layer denoted by "MaxPool." In some embodiments, the fully connected layers include a leaky rectified linear unit (LReLU) activation function, which outputs a linear combination of the inputs if the linear combination is greater than or equal to zero and the linear combination scaled by a non-zero gradient if the linear combination is less than zero.

More specifically, the exemplar style network 214 of FIG. 4B includes seven total layers. The first three layers are fully connected layers that accept an input of size "fsize" and generate an output of the same size. The fourth layer is a max pooling layer with a pooling region of size "pt." The fifth layer is a fully connected layer that accepts an input of size "fsize" and generates an output of size 256. The sixth layer is a fully connected layer that accepts an input of size 256 and generates an output of size 256. The seventh layer is a fully connected layer that accepts an input of size 256 and generates an output of size "csize."

As mentioned above, input into style network 214 includes an aggregation of two shape signatures for two different shapes, where one shape is generated by applying one or more augmentations 206 to the other shape. For example, the input could be computed as the difference between features for pairs of points within the two shape signatures, by a neural network, and/or via another type of aggregation of the shape signatures.

In one or more embodiments, "fsize" refers to the overall length of a shape signature outputted by encoder 212, "pt" represents the number of points associated with the shape signature, and "csize" corresponds to the size of the style code outputted by style network 214. For example, "fsize" could be set to the length of each row in the shape signature, and "csize" could be set to a value that is less than, equal to, or greater than "fsize." Consequently, the first three fully connected layers could be used to convert the aggregation of the two shape signatures into three intermediate representations, the fourth max pooling layer could be used to pool a matrix of intermediate representations generated by the third fully connected layer for points in the shape signature into a single vector, and the last two fully connected layers could be used to convert the pooled output of the max pooling layer into a style code of length "csize."

FIG. 4C illustrates an exemplar architecture for decoder 216 of FIG. 2, according to various embodiments. As shown in FIG. 4C, the architecture includes various fully connected layers denoted by "FC." In some embodiments, the fully connected layers include a leaky rectified linear unit (LReLU) activation function, which outputs a linear combination of the inputs if the linear combination is greater than or equal to zero and the linear combination scaled by a non-zero gradient if the linear combination is less than zero.

In particular, the exemplar decoder 216 of FIG. 4C includes four fully connected layers. The first fully connected layer accepts input of size "csize+fsize" and generates an output of size 256, the second and third fully connected layers each accept input of size 256 and generate output of the same size, and the last fully connected layer accepts an input of size 256 and generates an output of size 1. For example, the first fully connected layer could accept a concatenation of a style code of length "csize" and multiple sets of latent features for a point that occupy a vector of length "fsize." The input would be sequentially processed by the four fully connected layers until the last fully connected layer outputs a scalar SDF value and/or occupancy value for the same point.

Figure 5:
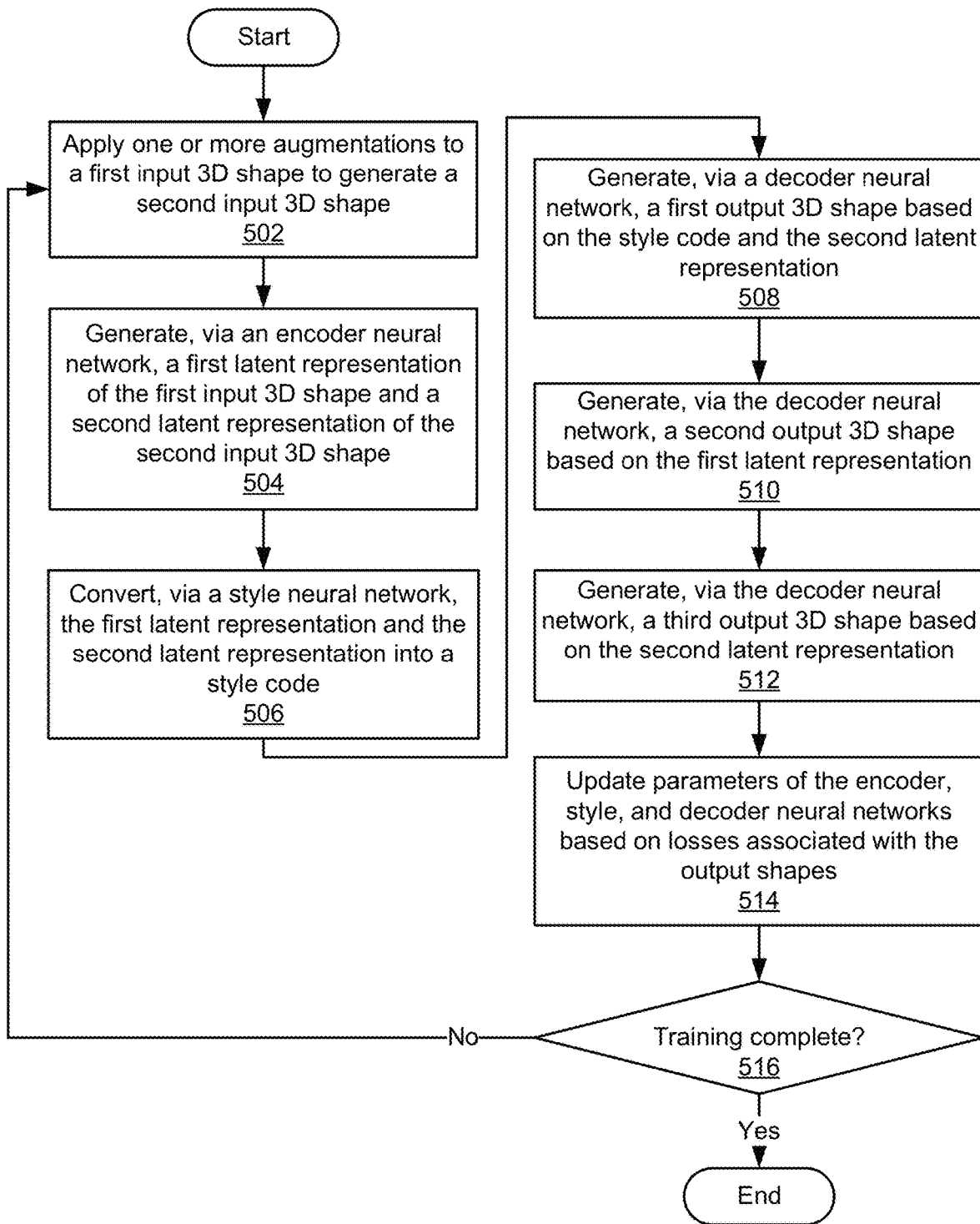
FIG. 5 sets forth a flow diagram of method steps for training a machine learning model to disentangle style and content associated with three-dimensional (3D) shapes, according to various embodiments.

FIG. 5 sets forth a flow diagram of method steps for training a machine learning model to disentangle style and content associated with 3D shapes, according to various embodiments. Although the method steps are described in conjunction with the systems of FIGS. 1-4, persons skilled in the art will understand that any system configured to perform the method steps in any order falls within the scope of the present disclosure.

As shown, in step 502, training engine 122 applies one or more augmentations to a first input 3D shape to generate a second input 3D shape. For example, training engine 122 could use a smoothing augmentation, coarsening augmentation, and/or another type of augmentation to transform the first input 3D shape into the second input 3D shape. The augmentations used in step 502 can be selected so that the second input 3D shape lacks certain visual attributes corresponding to the "style" of the first input 3D shape. The augmentations used in step 502 can also, or instead, be selected so that the second input 3D shape includes visual attributes that resemble those of a generative design and/or another type of 3D shape to which a given style is to be transferred.

In step 504, training engine 122 generates, via an encoder neural network, a first latent representation of the first input 3D shape and a second latent representation of the second input 3D shape. For example, training engine 122 could input a fixed-size grid of SDF values and/or occupancy values for each input 3D shape into the encoder neural network. Training engine 122 could use 3D convolutional layers, max pooling layers, and/or other types of neural network layers in the encoder neural network to generate multiple grids of latent feature values at gradually decreasing resolutions from the inputted grid of SDF values and/or occupancy values. Training engine 122 could also interpolate latent feature values for a subset of points in each grid that are closest to a point sampled near the surface of the input 3D shape into multiple sets of latent feature values for that point. Training engine 122 could then combine the interpolated sets of feature values for all points in a point cloud sampled near the surface of the input 3D shape into a matrix-based latent representation of that input 3D shape.

In step 506, training engine 122 converts, via a style neural network, the first latent representation and the second latent representation into a style code. For example, training engine 122 could input a difference of the two latent representations and/or another aggregation of the two latent representations into the style neural network. Training engine 122 could use fully connected layers, max pooling layers, and/or other types of neural network layers in the style neural network to convert a matrix-based representation of the input into a latent vector corresponding to the style code. The latent vector would thus encode the differences between the visual attributes of the two input 3D shapes.

In step 508, training engine 122 generates, via a decoder neural network, a first output 3D shape based on the style code and the second latent representation. For example, training engine 122 could input a concatenation and/or another combination of the style code and each row of latent feature values in the second latent representation into the decoder neural network. Training engine 122 could also use one or more fully connected layers and/or other types of neural network layers in the decoder neural network to convert the input into a prediction of an SDF value, occupancy value, and/or another value that can be used to derive the surface of the first output 3D shape from a 3D point represented by that row.

In step 510, training engine 122 generates, via the decoder neural network, a second output 3D shape based on the first latent representation. For example, training engine 122 could input each row of the first latent representation into the decoder neural network. Training engine 122 could use one or more fully connected layers and/or other types of neural network layers in the decoder neural network to convert the input into a prediction of an SDF value, occupancy value, and/or another value that can be used to derive the surface of the second output 3D shape from a 3D point represented by that row.

In step 512, training engine 122 generates, via the decoder neural network, a third output 3D shape based on the second latent representation. For example, training engine 122 could input each row of the second latent representation into the decoder neural network. Training engine 122 could use one or more fully connected layers and/or other types of neural network layers in the decoder neural network to convert the input into a prediction of an SDF value, occupancy value, and/or another value that can be used to derive the surface of the third output 3D shape from a 3D point represented by that row.

In step 514, training engine 122 updates parameters of the encoder, style, and decoder neural networks based on losses associated with the output shapes generated in steps 508-512. For example, training engine 122 could compute a first reconstruction loss between SDF and/or occupancy values of the first input 3D shape and the first output 3D shape, a second reconstruction loss between SDF and/or occupancy values of the first input 3D shape and the second output 3D shape, and a third reconstruction loss between SDF and/or occupancy values of the second input 3D shape and the third output 3D shape. Training engine 122 could then use gradient descent and backpropagation to update weights in the encoder, style, and decoder neural networks in a way that reduces all three reconstruction losses.

In step 516, training engine 122 determines whether or not training of the machine learning model is complete. For example, training engine 122 could determine that training is complete when one or more conditions are met. These condition(s) include (but are not limited to) convergence in the parameters of the encoder, style, and decoder neural networks; the lowering of the loss to below a threshold; and/or a certain number of training steps, iterations, batches, and/or epochs. While training of the machine learning model is not complete, training engine 122 continues performing steps 502-514. Training engine 122 then ends the process of training the machine learning model once the condition(s) are met.

Figure 6:
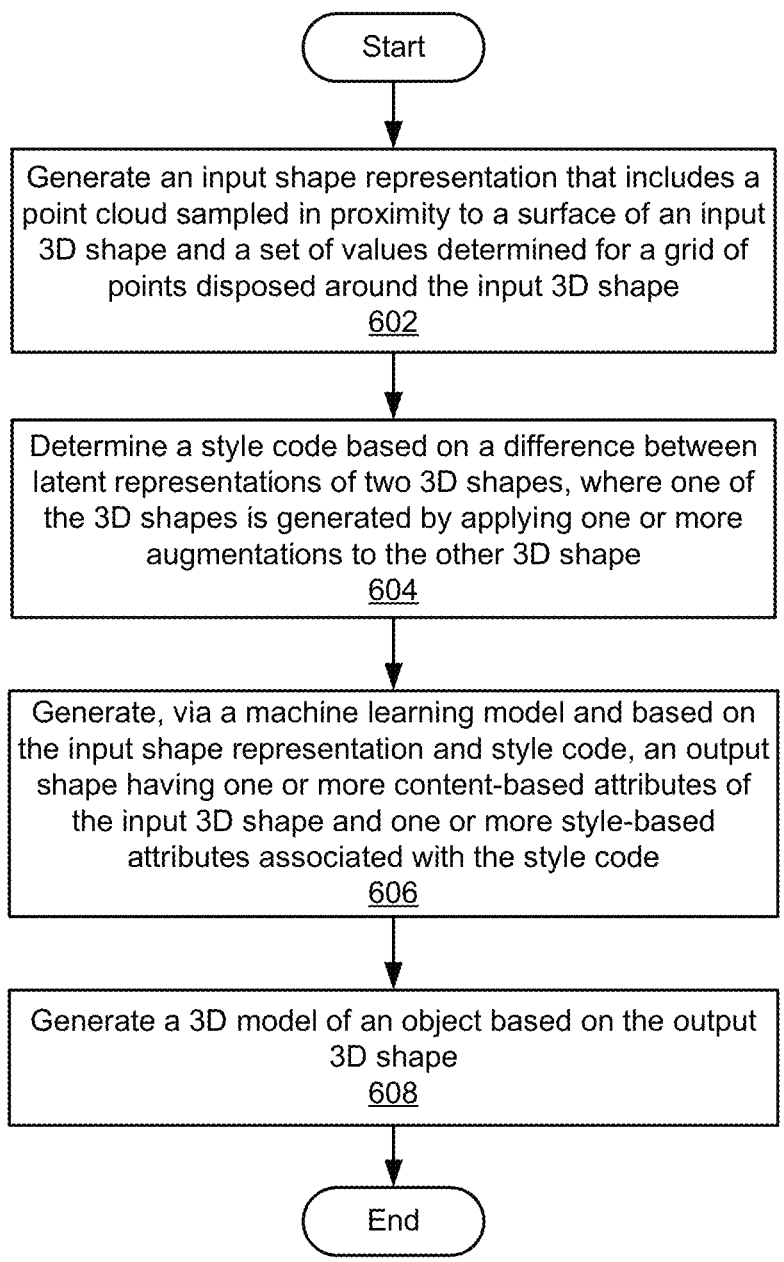
FIG. 6 sets forth a flow diagram of method steps for transferring a style to a 3D shape, according to various embodiments.

FIG. 6 sets forth a flow diagram of method steps for transferring a style to a 3D shape, according to various embodiments. Although the method steps are described in conjunction with the systems of FIGS. 1-4, persons skilled in the art will understand that any system configured to perform the method steps in any order falls within the scope of the present disclosure.

As shown, in step 602, execution engine 124 generates an input shape representation that includes a point cloud sampled in proximity to a surface of an input 3D shape and a set of values determined for a grid of points disposed around the input 3D shape. For example, execution engine 124 could receive the input 3D shape as a generative design for an object and/or generate the input 3D shape by applying one or more augmentations to another 3D shape. Execution engine 124 could generate the point cloud by adding a random, normally distributed displacement to points sampled on the surface of the input 3D shape. Execution engine 124 could also compute a set of SDF values and/or occupancy values for each point in the grid.

In step 604, execution engine 124 determines a style code based on a difference between latent representations of two 3D shapes, where one of the 3D shapes is generated by applying one or more augmentations to the other 3D shape. For example, execution engine 124 could use an encoder neural network to convert input representations of the two 3D shapes into two corresponding latent representations. Execution engine 124 could also use a style neural network to convert a difference between the latent representations and/or another aggregation of the two latent representations into a latent vector corresponding to the style code. In another example, execution engine 124 could retrieve a previously generated style code from a lookup table and/or another data store. In a third example, execution engine 124 could receive the style code from style-generation engine 126 after style-generation engine 126 engine has sampled the style code from a learned distribution of style codes, as described in further detail below with respect to FIG. 7.

In step 606, execution engine 124 generates, via a machine learning model and based on the input shape representation and style code, an output 3D shape having one or more content-based attributes of the input 3D shape and one or more style-based attributes associated with the style code. For example, execution engine 124 could use an encoder neural network to convert the input shape representation into a shape signature for the input 3D shape, as discussed above. The shape signature could include multiple rows, where each row represents a different point sampled near the surface of the input 3D shape and includes multiple set of latent features generated by the encoder neural network from the SDF and/or occupancy values in the grid. Execution engine 124 could also append the style code to the end of each row of the shape signature. Execution engine 124 could then use a decoder neural network to convert the data in each row of the shape signature, which includes the appended style code, into a prediction of an SDF value and/or occupancy value for the corresponding point.

In step 608, execution engine 124 generates a 3D model of an object based on the output 3D shape. For example, execution engine 124 could use a marching cubes technique and/or another technique to reconstruct the surface of the object from the predicted SDF and/or occupancy values and the corresponding point locations. Execution engine 124 could then store the reconstructed surface as a point cloud, mesh, and/or another representation of the 3D model.

Figure 7:
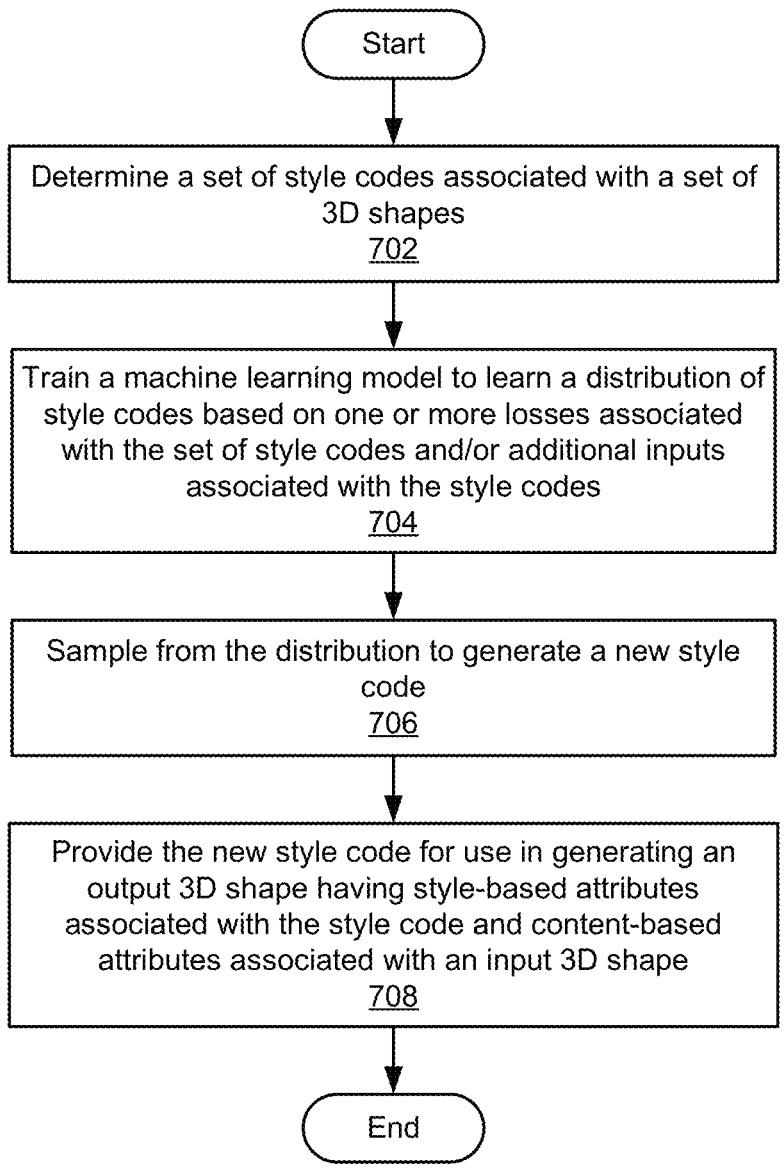
FIG. 7 sets forth a flow diagram of method steps for generating a new style to be transferred to one or more 3D shapes, according to various embodiments.

FIG. 7 sets forth a flow diagram of method steps for generating a new style to be transferred to one or more 3D shapes, according to various embodiments. Although the method steps are described in conjunction with the systems of FIGS. 1-4, persons skilled in the art will understand that any system configured to perform the method steps in any order falls within the scope of the present disclosure.

As shown, in step 702, style-generation engine 126 determines a set of style codes associated with a set of 3D shapes. For example, style-generation engine 126 could receive the style codes from training engine 122, execution engine 124, and/or a data store after the style codes are generated from pairs of 3D shapes, where one 3D shape in each pair is generated by applying one or more augmentations to the other 3D shape in the same pair. In another example, style-generation engine 126 could generate the style codes by using an encoder neural network to generate latent representations of pairs of 3D shapes (where one 3D shape in each pair is generated by applying one or more augmentations to the other 3D shape in the same pair) and using a style neural network to convert aggregations of the latent representations into corresponding style codes. Each style code thus captures the differences in visual attributes between a first shape and a second shape that is generated by augmenting the first shape.

In step 704, style-generation engine 126 trains a machine learning model to learn a distribution of the style codes based on one or more losses associated with the style codes and/or additional inputs associated with the style codes. For example, style-generation engine 126 could generate a machine learning model that learns mappings between the style codes and names, descriptions, sets of shapes, and/or other data associated with the style codes.

In another example, style-generation engine 126 could train a generative model to fit a distribution to the style codes. Style-generation engine 126 could also, or instead, use a contrastive learning technique and "positive" and "negative" pairs of style codes and text-based prompts to train the generative model. A "positive" pair could include a style code and a text-based prompt that describes the style-based attributes associated with the style code, and a "negative" pair could include a style code and a text-based prompt that does not describe the style-based attributes associated with the style code. The embedding space associated with the style codes in the pairs could correspond to the latent space of the style codes outputted by the style neural network, and the embedding space associated with the text-based prompts could correspond to a separate latent space learned by the generative model. The contrastive learning technique could include a max margin contrastive loss, triplet loss, N-pair loss, and/or another type of contrastive loss that causes the generative model to maximize the similarity of a style code and a text embedding when the style code and text-based prompt associated with the text embedding belong to a positive pair. This loss would also cause the generative model to minimize the similarity of a style code and a text embedding when the style code and text-based prompt associated with the text embedding belong to a negative pair. In a third example, style-generation engine 126 could train the machine learning model to learn distributions of latent spaces for other types of input (e.g., audio, video, depth maps, etc.) that describe or represent style-based attributes of 3D shapes based on positive and negative pairs of style codes (or other representations of shapes and/or styles) and these types of input.

In step 706, style-generation engine 126 samples from the distribution to generate a new style code. For example, style-generation engine 126 could use the machine learning model to convert a randomized input (e.g., a value sampled from a base distribution) into the new style code. In another example, style-generation engine 126 could interpolate, average, and/or otherwise combine multiple input style codes (or portions of input style codes) into the new style code. In a third example, style-generation engine 126 could generate the new style code by sampling from a region of the latent space of style codes that corresponds to a cluster of related styles, is bounded by points representing specific style codes, and/or is defined in another way. In a fourth example, style-generation engine 126 could generate the new style code in a way that reflects a description or representation of the corresponding style-based attributes.

In step 708, style-generation engine 126 provides the new style code for use in generating an output shape having style-based attributes associated with the style code and content-based attributes associated with an input 3D shape. For example, style-generation engine 126 could store the new style code in a data store and/or provide the new style code to execution engine 124. Execution engine 124 could then use an encoder neural network and a decoder neural network to convert the new style code and the input 3D shape into the output shape, as discussed above.

In sum, the disclosed techniques use machine learning models to perform style transfer in 3D shapes. More specifically, the disclosed techniques generate an output 3D shape that has the "content" (e.g., structure, semantic meaning, etc.) of an input 3D shape and a "style" (e.g., curves, corners, angles, dimensions, proportions, fine-grained details, etc.) that is distinct from that of the input 3D shape. The machine learning models include an encoder neural network that converts the input 3D shape into a shape signature that includes multiple sets of features associated with multiple resolutions. The machine learning models also include a style neural network that generates, for a given pair of 3D shapes, a style code that represents the differences between the two 3D shapes. The pair of 3D shapes includes a first 3D shape and a second 3D shape that is generated by applying one or more augmentations to the first 3D shape. These augmentations can be selected to remove visual attributes or features that correspond to the "style" of the first 3D shape from the first 3D shape. The machine learning models further include a decoder neural network that converts the shape signature of a given input 3D shape and a given style code into an output shape that captures the content of the input 3D shape and the style represented by the style code.

The encoder neural network, style neural network, and decoder neural network are trained in an unsupervised fashion to reconstruct various input 3D shapes. More specifically, the input 3D shapes include pairs of 3D shapes, where each pair includes one "original" shape and one "augmented" shape that is generated by applying the augmentation(s) to the original shape. The encoder neural network is used to generate two shape signatures from each pair of 3D shapes, and the decoder neural network is used to convert the shape signatures into two corresponding output 3D shapes. The encoder and decoder neural networks are also trained to minimize a reconstruction loss that is computed between each input 3D shape and the corresponding output 3D shape generated by the decoder neural network from the shape signature for the input 3D shape. An aggregation of the shape signatures for each pair of 3D shapes is also inputted into the style network to produce a corresponding style code, and the decoder neural network is used to generate a third output shape from a combination of the shape signature for the augmented shape in the pair and the style code. The encoder, style, and decoder neural networks are additionally trained to minimize a reconstruction loss between the original shape and the third output shape.

After training of the machine learning model is complete, style codes generated by the machine learning model from pairs of original and augmented shapes can be combined with additional input 3D shapes to transfer the styles represented by the style codes to the input 3D shapes. A separate machine learning model can also be trained to learn the distribution of style codes and generate new style codes by sampling from the distribution. These new style codes allow style transfer in 3D shapes to be expanded beyond style-based attributes that are explicitly extracted from pairs of shapes.

One technical advantage of the disclosed techniques relative to the prior art is that, with the disclosed techniques, attributes pertaining to style in 3D shapes can be disentangled from attributes pertaining to content in 3D shapes via an arbitrary set of augmentations to the 3D shapes. In this regard, the augmentations can be selected to target certain features or attributes that constitute the "style" of a set of 3D shapes, thereby enabling precise control over the extraction and transfer of large-scale and fine-grained details associated with a given 3D shape. Another technical advantage of the disclosed techniques is that a machine learning model can be used to perform style transfer in a single forward pass. Accordingly, the disclosed techniques reduce resource overhead relative to conventional approaches that perform style transfer between 3D shapes using resource-intensive iterative optimization procedures. An additional technical advantage of the disclosed techniques is that the disclosed techniques enable the machine learning model to be trained in an unsupervised reconstruction task using a large set of training shapes, which allows the machine learning model to generalize to a variety of visual attributes corresponding to both the content and style associated with 3D shapes. These technical advantages provide vone or more technological improvements over prior art approaches.

1. In some embodiments, a computer-implemented method for performing style transfer comprises determining a distribution associated with a plurality of style codes for a plurality of three-dimensional (3D) shapes, wherein each style code included in the plurality of style codes represents a difference between a first 3D shape and a second 3D shape, and wherein the second 3D shape is generated by applying one or more augmentations to the first 3D shape; sampling from the distribution to generate an additional style code; executing a first trained machine learning model based on the additional style code to generate an output 3D shape having one or more style-based attributes associated with the additional style code and one or more content-based attributes associated with an object; and generating a 3D model of the object based on the output 3D shape.

2. The computer-implemented method of clause 1, wherein determining the distribution comprises training a second machine learning model to learn the distribution based on one or more losses associated with the plurality of style codes.

3. The computer-implemented method of any of clauses 1-2, wherein the second machine learning model comprises a generative model.

4. The computer-implemented method of any of clauses 1-3, wherein sampling from the distribution comprises converting a randomized input into the additional style code.

5. The computer-implemented method of any of clauses 1-4, wherein sampling from the distribution comprises generating the additional style code based on a text-based prompt associated with the output 3D shape.

6. The computer-implemented method of any of clauses 1-5, wherein sampling from the distribution comprises sampling from a first distribution to generate a first portion of the additional style code that represents a first subset of the one or more style-based attributes; and sampling from a second distribution to generate a second portion of the additional style code that represents a second subset of the one or more style-based attributes.

7. The computer-implemented method of any of clauses 1-6, wherein generating the output 3D shape comprises inputting the additional style code and an input 3D shape associated with the object into a decoder neural network included in the first trained machine learning model; and executing the decoder neural network to generate the output 3D shape.

8. The computer-implemented method of any of clauses 1-7, wherein the output 3D shape comprises at least one of a set of signed distance function values or a set of occupancy values.

9. The computer-implemented method of any of clauses 1-8, wherein sampling from the distribution comprises generating the additional style code based on an aggregation of two or more style codes included in the plurality of style codes.

10. The computer-implemented method of any of clauses 1-9, wherein the aggregation comprises at least one of an average, a weighted average, or an interpolation.

11. In some embodiments, one or more non-transitory computer-readable media store instructions that, when executed by one or more processors, cause the one or more processors to perform the steps of determining a distribution associated with a plurality of style codes for a plurality of three-dimensional (3D) shapes, wherein each style code included in the plurality of style codes represents a difference between a first 3D shape and a second 3D shape, and wherein the second 3D shape is generated by applying one or more augmentations to the first 3D shape; sampling from the distribution to generate an additional style code; executing a first trained machine learning model based on the additional style code to generate an output 3D shape having one or more style-based attributes associated with the additional style code and one or more content-based attributes associated with an object; and generating a 3D model of the object based on the output 3D shape.

12. The one or more non-transitory computer-readable media of clause 11, wherein determining the distribution comprises training a second machine learning model to learns the distribution based on one or more losses associated with the plurality of style codes.

13. The one or more non-transitory computer-readable media of any of clauses 11-12, wherein the one or more losses comprise a contrastive loss that is generated based on the plurality of style codes and a plurality of additional inputs associated with the plurality of style codes.

14. The one or more non-transitory computer-readable media of any of clauses 11-13, wherein sampling from the distribution comprises converting, via a second trained machine learning model, one or more input values into the additional style code.

15. The one or more non-transitory computer-readable media of any of clauses 11-14, wherein the one or more input values comprise at least one of a randomized input, one or more style codes included in the plurality of style codes, or a portion of a style code.

16. The one or more non-transitory computer-readable media of any of clauses 11-15, wherein the one or more input values comprise at least one of a description of the one or more style-based attributes or a representation of the one or more style-based attributes.

17. The one or more non-transitory computer-readable media of any of clauses 11-16, wherein determining the distribution associated with the plurality of style codes comprises determining a first distribution associated with a first portion of the plurality of style codes that represents a first level of detail associated with the one or more style-based attributes; and determining a second distribution associated with a second portion of the plurality of style codes that represents a second level of detail associated with the one or more style-based attributes.

18. The one or more non-transitory computer-readable media of any of clauses 11-17, wherein sampling from the distribution comprises generating the additional style code based on an aggregation of two or more style codes included in the plurality of style codes.

19. The one or more non-transitory computer-readable media of any of clauses 11-18, wherein the one or more augmentations comprise at least one of a smoothing augmentation or a coarsening augmentation.

20. In some embodiments, a system comprises one or more memories that store instructions, and one or more processors that are coupled to the one or more memories and, when executing the instructions, are configured to perform the steps of determining a distribution associated with a plurality of style codes for a plurality of three-dimensional (3D) shapes, wherein each style code included in the plurality of style codes represents a difference between a first 3D shape and a second 3D shape, and wherein the second 3D shape is generated by applying one or more augmentations to the first 3D shape; sampling from the distribution to generate an additional style code; executing a first trained machine learning model based on the additional style code to generate an output 3D shape having one or more style-based attributes associated with the additional style code and one or more content-based attributes associated with an object; and generating a 3D model of the object based on the output 3D shape.

Any and all combinations of any of the claim elements recited in any of the claims and/or any elements described in this application, in any fashion, fall within the contemplated scope of the present invention and protection.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "module," a "system," or a "computer." In addition, any hardware and/or software technique, process, function, component, engine, module, or system described in the present disclosure may be implemented as a circuit or set of circuits. Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine. The instructions, when executed via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable gate arrays.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

What is claimed is:

1. A computer-implemented method for performing style transfer, the method comprising:
    determining a distribution associated with a plurality of style codes for a plurality of three-dimensional (3D) shapes, wherein each style code included in the plurality of style codes represents a difference between a first 3D shape and a second 3D shape, and wherein the second 3D shape is generated by applying one or more augmentations to the first 3D shape;
    sampling from the distribution to generate an additional style code;
    executing a first trained machine learning model based on the additional style code to generate an output 3D shape having one or more style-based attributes associated with the additional style code and one or more content-based attributes associated with an object; and
    generating a 3D model of the object based on the output 3D shape.

2. The computer-implemented method of claim 1, wherein determining the distribution comprises training a second machine learning model to learn the distribution based on one or more losses associated with the plurality of style codes.

3. The computer-implemented method of claim 2, wherein the second machine learning model comprises a generative model.

4. The computer-implemented method of claim 1, wherein sampling from the distribution comprises converting a randomized input into the additional style code.

5. The computer-implemented method of claim 1, wherein sampling from the distribution comprises generating the additional style code based on a text-based prompt associated with the output 3D shape.

6. The computer-implemented method of claim 1, wherein sampling from the distribution comprises:
    sampling from a first distribution to generate a first portion of the additional style code that represents a first subset of the one or more style-based attributes; and
    sampling from a second distribution to generate a second portion of the additional style code that represents a second subset of the one or more style-based attributes.

7. The computer-implemented method of claim 1, wherein generating the output 3D shape comprises:
    inputting the additional style code and an input 3D shape associated with the object into a decoder neural network included in the first trained machine learning model; and
    executing the decoder neural network to generate the output 3D shape.

8. The computer-implemented method of claim 7, wherein the output 3D shape comprises at least one of a set of signed distance function values or a set of occupancy values.

9. The computer-implemented method of claim 1, wherein sampling from the distribution comprises generating the additional style code based on an aggregation of two or more style codes included in the plurality of style codes.

10. The computer-implemented method of claim 9, wherein the aggregation comprises at least one of an average, a weighted average, or an interpolation.

11. One or more non-transitory computer-readable media storing instructions that, when executed by one or more processors, cause the one or more processors to perform the steps of:
 determining a distribution associated with a plurality of style codes for a plurality of three-dimensional (3D) shapes, wherein each style code included in the plurality of style codes represents a difference between a first 3D shape and a second 3D shape, and wherein the second 3D shape is generated by applying one or more augmentations to the first 3D shape;
 sampling from the distribution to generate an additional style code;
 executing a first trained machine learning model based on the additional style code to generate an output 3D shape having one or more style-based attributes associated with the additional style code and one or more content-based attributes associated with an object; and
 generating a 3D model of the object based on the output 3D shape.

12. The one or more non-transitory computer-readable media of claim 11, wherein determining the distribution comprises training a second machine learning model to learns the distribution based on one or more losses associated with the plurality of style codes.

13. The one or more non-transitory computer-readable media of claim 12, wherein the one or more losses comprise a contrastive loss that is generated based on the plurality of style codes and a plurality of additional inputs associated with the plurality of style codes.

14. The one or more non-transitory computer-readable media of claim 11, wherein sampling from the distribution comprises converting, via a second trained machine learning model, one or more input values into the additional style code.

15. The one or more non-transitory computer-readable media of claim 14, wherein the one or more input values comprise at least one of a randomized input, one or more style codes included in the plurality of style codes, or a portion of a style code.

16. The one or more non-transitory computer-readable media of claim 14, wherein the one or more input values comprise at least one of a description of the one or more style-based attributes or a representation of the one or more style-based attributes.

17. The one or more non-transitory computer-readable media of claim 11, wherein determining the distribution associated with the plurality of style codes comprises:
 determining a first distribution associated with a first portion of the plurality of style codes that represents a first level of detail associated with the one or more style-based attributes; and
 determining a second distribution associated with a second portion of the plurality of style codes that represents a second level of detail associated with the one or more style-based attributes.

18. The one or more non-transitory computer-readable media of claim 11, wherein sampling from the distribution comprises generating the additional style code based on an aggregation of two or more style codes included in the plurality of style codes.

19. The one or more non-transitory computer-readable media of claim 11, wherein the one or more augmentations comprise at least one of a smoothing augmentation or a coarsening augmentation.

20. A system, comprising:
 one or more memories that store instructions, and
 one or more processors that are coupled to the one or more memories and,
  when executing the instructions, are configured to perform the steps of:
 determining a distribution associated with a plurality of style codes for a plurality of three-dimensional (3D) shapes, wherein each style code included in the plurality of style codes represents a difference between a first 3D shape and a second 3D shape, and wherein the second 3D shape is generated by applying one or more augmentations to the first 3D shape;
 sampling from the distribution to generate an additional style code;
 executing a first trained machine learning model based on the additional style code to generate an output 3D shape having one or more style-based attributes associated with the additional style code and one or more content-based attributes associated with an object; and
 generating a 3D model of the object based on the output 3D shape.

* * * * *